(12) United States Patent
Sugawara et al.

(10) Patent No.: US 11,979,182 B2
(45) Date of Patent: May 7, 2024

(54) NOISE ELIMINATION DEVICE, ANTENNA DEVICE, AND NOISE ELIMINATION METHOD

(71) Applicant: MITSUBISHI ELECTRIC CORPORATION, Tokyo (JP)

(72) Inventors: Retsu Sugawara, Tokyo (JP); Jun Takahashi, Tokyo (JP); Yuji Matsuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/801,694

(22) PCT Filed: May 13, 2020

(86) PCT No.: PCT/JP2020/019106
§ 371 (c)(1),
(2) Date: Aug. 23, 2022

(87) PCT Pub. No.: WO2021/229715
PCT Pub. Date: Nov. 18, 2021

(65) Prior Publication Data
US 2023/0126042 A1    Apr. 27, 2023

(51) Int. Cl.
*H04B 1/12* (2006.01)
*H04B 1/10* (2006.01)

(52) U.S. Cl.
CPC ............. *H04B 1/12* (2013.01); *H04B 1/1036* (2013.01)

(58) Field of Classification Search
CPC ................................ H04B 1/12; H04B 1/1036
See application file for complete search history.

(56) References Cited

U.S. PATENT DOCUMENTS

2008/0159442 A1* 7/2008 Tanabe ................ H04L 27/3863
375/324
2010/0304666 A1* 12/2010 Hottinen ................ H04B 7/155
455/73
2020/0119759 A1* 4/2020 Kishimoto ........... H04B 1/1036

FOREIGN PATENT DOCUMENTS

| JP | 2016-92721 A | 5/2016 |
| JP | 2017-59934 A | 3/2017 |
| JP | 2019-186593 A | 10/2019 |

OTHER PUBLICATIONS

International Search Report for PCT/JP2020/019106 (PCT/ISA/210) mailed on Aug. 4, 2020.
Written Opinion of the International Searching Authority for PCT/JP2020/019106 (PCT/ISA/237) mailed on Aug. 4, 2020.
German Office Action dated Jun. 13, 2023 for Application No. 11 2020 006 823.4 with an English translation.

* cited by examiner

*Primary Examiner* — Junpeng Chen
(74) *Attorney, Agent, or Firm* — Birch, Stewart, Kolasch & Birch, LLP

(57) ABSTRACT

A noise elimination device includes a noise elimination unit to generate a noise-eliminated spectrum by performing noise elimination on the basis of symmetry of noise superimposed on a reception signal spectrum.

14 Claims, 15 Drawing Sheets

NOISE ELIMINATION DEVICE, ANTENNA DEVICE, AND NOISE ELIMINATION METHOD

TECHNICAL FIELD

The present disclosure relates to a noise elimination device.

BACKGROUND ART

For example, an in-phase component and a quadrature component are generated by quadrature demodulation of an amplitude modulation signal using a double sideband (hereinafter, "double-sideband amplitude modulation signal"). The in-phase component includes a signal component and a noise component, whereas the quadrature component does not include the signal component and includes only the noise component. Focusing on this, a technique of detecting and eliminating a noise component superimposed on the signal component in the in-phase component on the basis of the noise component in the quadrature component is conventionally known (see, for example, Patent Literature 1).

CITATION LIST

Patent Literatures

Patent Literature 1: JP 2017-59934 A

SUMMARY OF INVENTION

Technical Problem

In the above technique, in a case where two noises superimposed on a double-sideband amplitude modulation signal are symmetric with respect to the carrier frequency of the double-sideband amplitude modulation signal in the frequency spectrum of the double-sideband amplitude modulation signal, the noise may not be detected and eliminated because the noise does not appear in the quadrature component described above. More specifically, for example, in a case where noises are symmetric with respect to the carrier frequency and have the same amplitude and the same sign, there is a problem that although the noise is not present in the quadrature component, the noise appears in an in-phase component, which is the result of demodulation, and thus the noise cannot be eliminated as a result of an elimination process. Note that the two noises are hereinafter referred to as "symmetric noise".

In addition, in the technique described above, in a case where the symmetric noise is superimposed on the double-sideband amplitude modulation signal, although there is no noise in the in-phase component, the noise appears in the quadrature component, and thus the noise may increase as a result of the noise elimination process. More specifically, for example, in a case where noises are symmetric with respect to the carrier frequency and have the same amplitude and the opposite sign, there is a problem that although the noise is not present in the in-phase component, which is the result of demodulation, the noise appears in the quadrature component, and thus the noise may increase as a result of the elimination process.

Not limited to the problems in the technique of Patent Literature 1, there is a demand for a technique of suppressing a decrease in the accuracy of noise elimination in a reception signal on which noise is superimposed.

The present disclosure has been made to solve the above problems, and an object of the present disclosure is to provide a technique of suppressing a decrease in the accuracy of noise elimination.

Solution to Problem

A noise elimination device according to the present disclosure includes processing circuitry to perform a process to: detect a reception signal; generate a reception signal spectrum by performing discrete Fourier transform on a complex detection output and generate a noise-eliminated spectrum by performing noise elimination on a basis of noise superimposed on the reception signal spectrum, wherein the noise superimposed on the reception signal spectrum indicates a frequency spectrum with symmetry with respect to a center frequency of the noise, and the process generates the noise-eliminated spectrum by performing noise elimination on a basis of symmetry of the noise superimposed on the reception signal spectrum.

Advantageous Effects of Invention

According to the present disclosure, it is possible to suppress a decrease in the accuracy of noise elimination.

DESCRIPTION OF EMBODIMENTS

Hereinafter, in order to describe the present disclosure in more detail, embodiments for carrying out the present disclosure will be described with reference to the accompanying drawings.

First Embodiment

Figure 1:
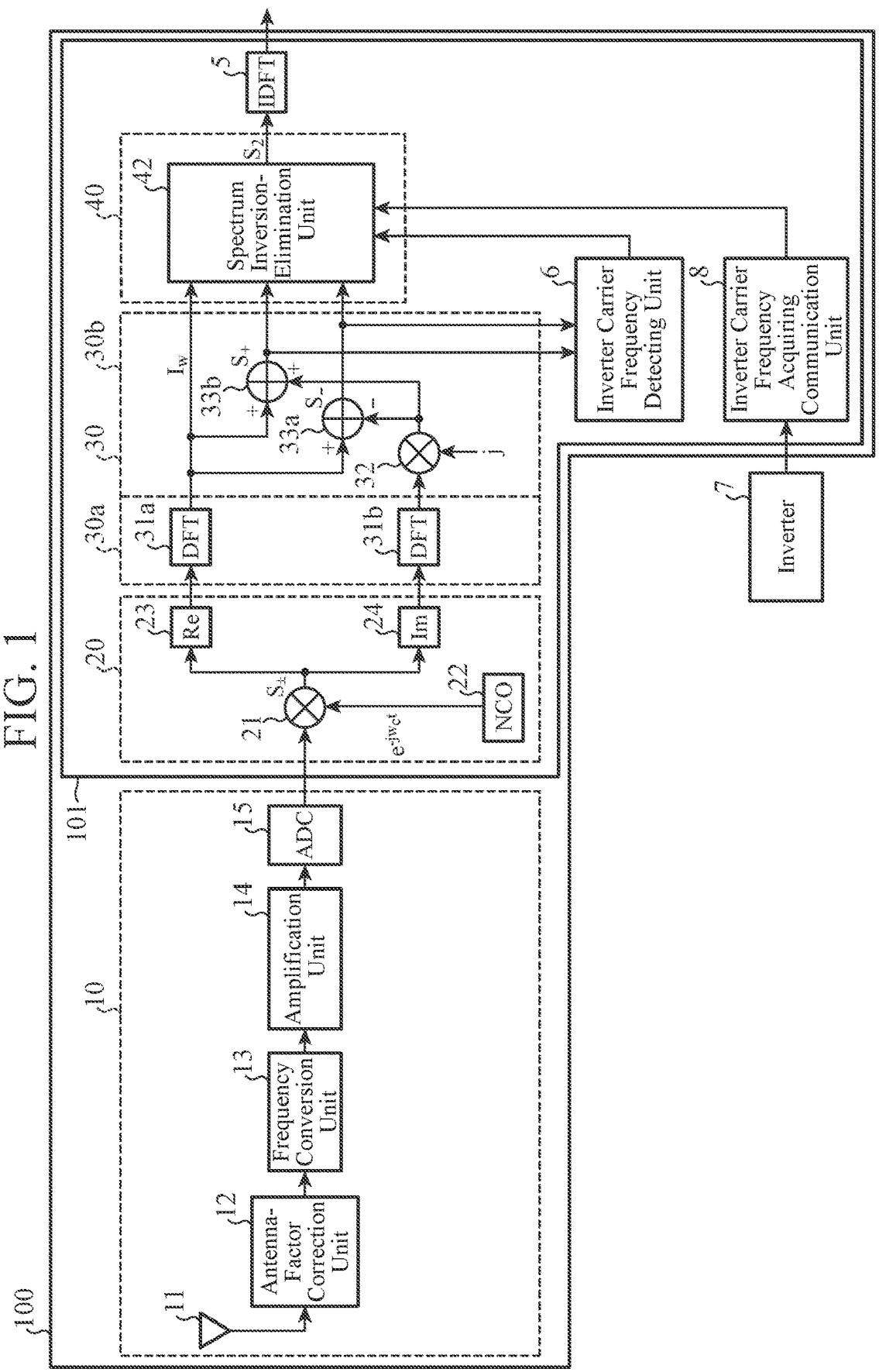
FIG. 1 is a block diagram illustrating a configuration of an antenna device according to a first embodiment.

FIG. 1 is a block diagram illustrating a configuration of an antenna device 100 according to a first embodiment. As illustrated in FIG. 1, the antenna device 100 includes a reception-signal input unit 10 (reception unit) and a noise elimination device 101. The noise elimination device 101 includes a synchronous detection unit 20 (detection unit), a spectrum generation unit 30, a noise elimination unit 40, an IDFT 5 (inverse discrete Fourier transform unit), an inverter carrier frequency detecting unit 6, and an inverter carrier frequency acquiring communication unit 8.

The reception-signal input unit 10 (reception unit) acquires a reception signal. For example, the reception signal is a reception signal from television broadcasting or radio broadcasting. More specifically, in the first embodiment, the reception-signal input unit 10 acquires a double-sideband amplitude modulation signal by receiving a double-sideband amplitude modulation wave. The reception-signal input unit 10 outputs the acquired double-sideband amplitude modulation signal to the synchronous detection unit 20 of the noise elimination device 101.

More specifically, in the first embodiment, the reception-signal input unit 10 includes an antenna 11, an antenna-factor correction unit 12, a frequency conversion unit 13, an amplification unit 14, and an ADC 15 (analog-digital converter).

The antenna 11 acquires a reception signal. More specifically, in the first embodiment, the antenna 11 acquires a double-sideband amplitude modulation signal by receiving a double-sideband amplitude modulation wave. The antenna 11 outputs the acquired double-sideband amplitude modulation signal to the antenna-factor correction unit 12.

The antenna-factor correction unit 12 corrects the reception signal acquired by the antenna 11 in such a manner that the antenna factor of the antenna 11 is constant. More specifically, in the first embodiment, the antenna-factor correction unit 12 corrects the double-sideband amplitude modulation signal acquired by the antenna 11 in such a manner that the antenna factor of the antenna 11 is constant. In other words, the antenna-factor correction unit 12 eliminates a component due to a variation in the antenna factor of the antenna 11 in the double-sideband amplitude modulation signal acquired by the antenna 11. The antenna-factor correction unit 12 outputs the corrected double-sideband amplitude modulation signal to the frequency conversion unit 13.

Note that, in a broadcast format with a narrow band such as AM radio broadcasting using a double-sideband amplitude modulation signal, the frequency characteristic at an antenna reception point can be regarded as a flat characteristic with a constant frequency, and thus, it is not necessary to correct the antenna factor of the antenna 11.

The frequency conversion unit 13 performs frequency conversion on the double-sideband amplitude modulation signal corrected by the antenna-factor correction unit 12 into an IF band signal. The frequency conversion unit 13 outputs the frequency-converted double-sideband amplitude modulation signal to the amplification unit 14.

The amplification unit 14 amplifies the double-sideband amplitude modulation signal subjected to the frequency conversion by the frequency conversion unit 13. The amplification unit 14 outputs the amplified double-sideband amplitude modulation signal to the ADC 15.

The ADC 15 converts the double-sideband amplitude modulation signal amplified by the amplification unit 14 from an analog signal to a digital signal. The ADC 15 outputs the double-sideband amplitude modulation signal converted into the digital signal to the synchronous detection unit 20.

The synchronous detection unit 20 (detection unit) detects a reception signal. More specifically, in the first embodiment, the reception signal is a double-sideband amplitude modulation signal, and the synchronous detection unit 20 generates an in-phase signal and a quadrature signal by performing synchronous detection on the double-sideband amplitude modulation signal. More specifically, in the first embodiment, the synchronous detection unit 20 generates the in-phase signal and the quadrature signal by performing synchronous detection on the double-sideband amplitude modulation signal acquired by the reception-signal input unit 10. More specifically, in the first embodiment, the synchronous detection unit 20 generates the in-phase signal and the quadrature signal by performing synchronous detection on the double-sideband amplitude modulation signal converted into the digital signal by the ADC 15. The synchronous detection unit 20 outputs the generated in-phase signal and the generated quadrature signal to the spectrum generation unit 30. More specifically, the synchronous detection unit 20 generates the in-phase signal and the quadrature signal by multiplying the double-sideband amplitude modulation signal by a signal synchronized with the carrier of the double-sideband amplitude modulation signal. Note that the "signal synchronized with the carrier of the double-sideband amplitude modulation signal" means a signal that has the same frequency as the carrier of the double-sideband amplitude modulation signal and a phase synchronized with the carrier.

More specifically, in the first embodiment, the synchronous detection unit 20 includes a multiplier 21, an NCO 22 (numerically controlled oscillator), an in-phase-signal extraction unit 23, and a quadrature-signal extraction unit 24.

The NCO 22 outputs a signal synchronized with the carrier of the double-sideband amplitude modulation signal (for example, $e^{-j\omega_c t}$ in FIG. 1). More specifically, in the first embodiment, the NCO 22 outputs the signal synchronized with the carrier of the double-sideband amplitude modulation signal acquired by the reception-signal input unit 10 to the multiplier 21.

The multiplier 21 performs synchronous detection by multiplying the signal output by the NCO 22 by the double-sideband amplitude modulation signal. More specifically, in the first embodiment, the multiplier 21 performs synchronous detection by multiplying the signal output by the NCO 22 by the double-sideband amplitude modulation signal acquired by the reception-signal input unit 10. More specifically, in the first embodiment, the multiplier 21 performs synchronous detection by multiplying the signal output by the NCO 22 by the double-sideband amplitude modulation signal converted to the digital signal by the ADC 15. The multiplier 21 outputs the double-sideband amplitude modulation signal subjected to the synchronous detection to the in-phase-signal extraction unit 23 and the quadrature-signal extraction unit 24.

The in-phase-signal extraction unit 23 extracts an in-phase signal from the double-sideband amplitude modulation signal on which synchronous detection is performed by the multiplier 21. The in-phase-signal extraction unit 23 outputs the extracted in-phase signal to the spectrum generation unit 30.

The quadrature-signal extraction unit 24 extracts a quadrature signal from the double-sideband amplitude modulation signal on which the synchronous detection is performed by the multiplier 21. The quadrature-signal extraction unit 24 outputs the extracted quadrature signal to the spectrum generation unit 30.

The spectrum generation unit 30 includes a discrete Fourier transform unit 30a and a spectrum calculation unit 30b.

The discrete Fourier transform unit 30a generates a reception signal spectrum by performing discrete Fourier transform on the complex detection output of the synchronous detection unit 20 (detection unit). Note that the reception signal spectrum means a spectrum based on a reception signal, and in the first embodiment, the reception signal spectrum corresponds to an upper-sideband signal spectrum, a lower-sideband signal spectrum, or the like to be described later.

More specifically, in the first embodiment, the discrete Fourier transform unit 30a generates an in-phase signal spectrum by performing discrete Fourier transform on the in-phase signal generated by the synchronous detection unit 20, and generates a quadrature signal spectrum by performing discrete Fourier transform on the quadrature signal generated by the synchronous detection unit 20. The discrete Fourier transform unit 30a outputs the generated in-phase signal spectrum and the generated quadrature signal spectrum to the spectrum calculation unit 30b. Note that the in-phase signal spectrum and the quadrature signal spectrum here are frequency domain signals.

More specifically, in the first embodiment, the discrete Fourier transform unit 30a includes a DFT 31a and a DFT 31b.

The DFT 31a (first discrete Fourier transform unit) generates an in-phase signal spectrum by performing discrete Fourier transform on the in-phase signal extracted by the in-phase-signal extraction unit 23. The DFT 31a outputs the generated in-phase signal spectrum ($I_w$ in FIG. 1) to the spectrum calculation unit 30b and the noise elimination unit 40.

The DFT 31b (second discrete Fourier transform unit) generates a quadrature signal spectrum by performing discrete Fourier transform on the quadrature signal extracted by the quadrature-signal extraction unit 24. The DFT 31b outputs the generated quadrature signal spectrum to the spectrum calculation unit 30b.

The spectrum calculation unit 30b multiplies the quadrature signal spectrum generated by the discrete Fourier transform unit 30a by an imaginary unit. In addition, the spectrum calculation unit 30b calculates an upper-sideband signal spectrum by adding the quadrature signal spectrum to which the imaginary unit is multiplied to the in-phase signal spectrum generated by the discrete Fourier transform unit 30a. Moreover, the spectrum calculation unit 30b calculates a lower-sideband signal spectrum by subtracting the quadrature signal spectrum to which the imaginary unit is multiplied from the in-phase signal spectrum generated by the discrete Fourier transform unit 30a. The spectrum calculation unit 30b outputs the calculated upper-sideband signal spectrum and the calculated lower-sideband signal spectrum to the noise elimination unit 40.

More specifically, in the first embodiment, the spectrum calculation unit 30b includes a multiplier 32, an adder 33b, and an adder 33a.

The multiplier 32 multiplies the quadrature signal spectrum generated by the DFT 31b by the imaginary unit. The multiplier 32 outputs the quadrature signal spectrum to which the imaginary unit is multiplied to the adder 33b and the adder 33a.

The adder 33b calculates an upper-sideband signal spectrum by adding the quadrature signal spectrum to which the imaginary unit is multiplied by the multiplier 32 to the in-phase signal spectrum generated by the DFT 31a. The adder 33b outputs the calculated upper-sideband signal spectrum (S+ in FIG. 1) to the noise elimination unit 40.

The adder 33a calculates a lower-sideband signal spectrum by subtracting the quadrature signal spectrum to which the imaginary unit is multiplied by the multiplier 32 from the in-phase signal spectrum generated by the DFT 31a. The adder 33a outputs the calculated lower-sideband signal spectrum (S− in FIG. 1) to the noise elimination unit 40.

The noise elimination unit 40 generates a noise-eliminated spectrum by performing noise elimination on the basis of the noise superimposed on a reception signal spectrum. More specifically, the noise elimination unit 40 generates the noise-eliminated spectrum by performing noise elimination on the basis of the symmetry of the noise superimposed on the reception signal spectrum. More specifically, in the first embodiment, the noise elimination unit 40 generates the noise-eliminated spectrum by performing noise elimination on the basis of the noise superimposed on at least one reception signal spectrum of the upper-sideband signal spectrum or the lower-sideband signal spectrum calculated by the spectrum calculation unit 30b. The noise elimination unit 40 outputs the generated noise-eliminated spectrum ($S_2$ in FIG. 1) to the IDFT 5.

More specifically, in the first embodiment, the noise elimination unit 40 includes a spectrum inversion-elimination unit 42. In the first embodiment, the noise superimposed on the upper-sideband signal spectrum and the lower-sideband signal spectrum calculated by the spectrum calculation unit 30b indicates a frequency spectrum with symmetry. The spectrum inversion-elimination unit 42 of the noise elimination unit 40 generates a noise-eliminated spectrum by performing noise elimination on the basis of the symmetry of the noise superimposed on at least one reception signal spectrum of the upper-sideband signal spectrum or the lower-sideband signal spectrum calculated by the spectrum calculation unit 30b. A more detailed configuration of the noise elimination unit 40 will be described later. Note that it is only required that the noise indicating a frequency spectrum with symmetry is superimposed on a reception signal, and the reception signal is not limited to the double-sideband amplitude modulation signal. For example, the reception signal may be a reception signal other than the double-sideband amplitude modulation signal from radio broadcasting or television broadcasting. In this case, the noise elimination unit 40 eliminates the noise superimposed on a reception signal other than the double-sideband amplitude modulation signal from radio broadcasting or television broadcasting.

The IDFT 5 generates a time domain signal by performing inverse discrete Fourier transform on the noise-eliminated spectrum generated by the noise elimination unit 40. The time domain signal generated by the IDFT 5 is used, for example, for audio output.

The inverter carrier frequency detecting unit 6 detects the carrier frequency of an inverter 7 by referring to the upper-sideband signal spectrum and the lower-sideband signal spectrum calculated by the spectrum calculation unit 30b. The inverter carrier frequency detecting unit 6 outputs the detected carrier frequency to the noise elimination unit 40. Note that examples of the inverter 7 include an inverter mounted on an automobile.

The inverter carrier frequency acquiring communication unit 8 acquires information related to the carrier frequency of the inverter 7 from the inverter 7. More specifically, in the first embodiment, the inverter carrier frequency acquiring communication unit 8 acquires the information related to the carrier frequency of the inverter 7 from the inverter 7 by communicating with the inverter 7. The inverter carrier frequency acquiring communication unit 8 outputs the acquired information to the noise elimination unit 40.

Note that the noise elimination device 101 may include one of the inverter carrier frequency detecting unit 6 and the inverter carrier frequency acquiring communication unit 8, or does not need to include both the inverter carrier frequency detecting unit 6 and the inverter carrier frequency acquiring communication unit 8. For example, in a case where the noise elimination device 101 does not include both the inverter carrier frequency detecting unit 6 and the inverter carrier frequency acquiring communication unit 8, the carrier frequency of the inverter 7 is set in the noise elimination device 101 in advance.

Figure 2C:
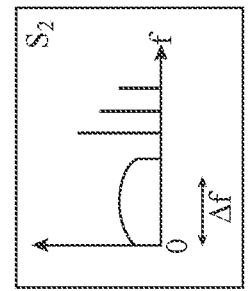
FIG. 2C is a graph illustrating a noise-eliminated spectrum generated by a spectrum inversion-elimination unit of a noise elimination unit according to the first embodiment.
Figure 2B:
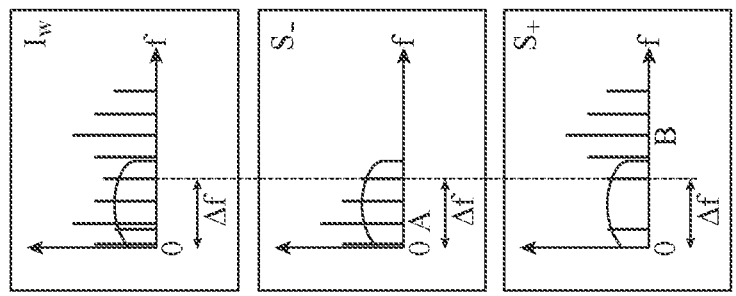
FIG. 2B illustrates a graph of an in-phase signal spectrum generated by a DFT of a discrete Fourier transform unit according to the first embodiment, a graph of a lower-sideband signal spectrum calculated by an adder of a spectrum calculation unit according to the first embodiment, and a graph of an upper-sideband signal spectrum calculated by the adder of the spectrum calculation unit according to the first embodiment.
Figure 2A:
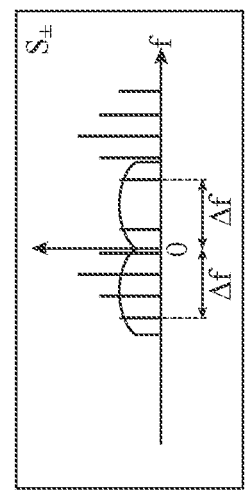
FIG. 2A is a graph illustrating a frequency domain spectrum obtained by performing discrete Fourier transform on a double-sideband amplitude modulation signal on which synchronous detection is performed by a multiplier of a synchronous detection unit according to the first embodiment.

Hereinafter, a more specific function of the noise elimination unit 40 will be described with reference to the drawings. FIG. 2A is a graph illustrating a frequency domain spectrum (S±) obtained by performing discrete Fourier transform on a double-sideband amplitude modulation signal on which synchronous detection is performed by the multiplier 21 of the synchronous detection unit 20. FIG. 2B illustrates a graph (upper graph) of an in-phase signal spectrum generated by the DFT 31a of the discrete Fourier transform unit 30a, a graph (middle graph) of a lower-sideband signal spectrum calculated by the adder 33a of the spectrum calculation unit 30b, and a graph (lower graph) illustrating an upper-sideband signal spectrum calculated by the adder 33b of the spectrum calculation unit 30b. FIG. 2C is a graph illustrating a noise-eliminated spectrum generated by the spectrum inversion-elimination unit 42 of the noise elimination unit 40.

As indicated by two bar lines at a frequency of Δf in FIG. 2A, the symmetric noise is superimposed on the double-sideband amplitude modulation signal. As described above, the symmetric noise may appear in only one of an in-phase signal and a quadrature signal. However, as indicated by the graph (middle graph) of the lower-sideband signal spectrum and the graph (lower graph) of the upper-sideband signal spectrum in FIG. 2B, in the upper-sideband signal spectrum and the lower-sideband signal spectrum calculated by the spectrum calculation unit 30b according to the first embodiment, the noise corresponding to the symmetric noise appears in both the upper-sideband signal spectrum and the lower-sideband signal spectrum. This is because each of the upper-sideband signal spectrum and the lower-sideband signal spectrum is generated on the basis of both the in-phase signal and the quadrature signal.

In the first embodiment, the noise superimposed on the upper-sideband signal spectrum and the lower-sideband signal spectrum calculated by the spectrum calculation unit 30b is inverter noise indicating a frequency spectrum with symmetry. The spectrum inversion-elimination unit 42 of the noise elimination unit 40 extracts a first frequency closest to the carrier frequency of the double-sideband amplitude modulation signal acquired by the reception-signal input unit 10 and a second frequency second closest to the carrier frequency of the double-sideband amplitude modulation signal acquired by the reception-signal input unit 10 from frequencies of integer multiples of the carrier frequency of the inverter 7 that is the source of generation of the inverter noise. Here, the carrier frequency of the inverter 7 is a carrier frequency output from the inverter carrier frequency detecting unit 6 or the inverter carrier frequency acquiring communication unit 8 described above. Alternatively, the carrier frequency of the inverter 7 here may be a carrier frequency set in advance in the noise elimination device 101.

The spectrum inversion-elimination unit 42 of the noise elimination unit 40 inverts, in the upper-sideband signal spectrum or the lower-sideband signal spectrum calculated by the spectrum calculation unit 30*b*, the noise of the inverter noise that is present in the band on the opposite side to the band on the side of the origin corresponding to the carrier frequency of the double-sideband amplitude modulation signal with respect to the frequency corresponding to the first frequency to the side of the origin with the frequency corresponding to the first frequency as the center. The frequency corresponding to the first frequency here corresponds to a center frequency A in the graph (middle graph) of the lower-sideband signal spectrum in FIG. 2B. Furthermore, the origin corresponding to the carrier frequency of the double-sideband amplitude modulation signal here corresponds to a frequency of zero in the graph (middle graph) of the lower-sideband signal spectrum and the graph (lower graph) of the upper-sideband signal spectrum in FIG. 2B. Moreover, the band on the opposite side to the band on the side of the origin corresponding to the carrier frequency of the double-sideband amplitude modulation signal with reference to the frequency corresponding to the first frequency here corresponds to the band on the right side of the center frequency A in the graph (middle graph) of the lower-sideband signal spectrum in FIG. 2B. Here, in a case where the carrier frequency of the double-sideband amplitude modulation signal is fr and the first frequency is f1, the center frequency A is f1-fr.

The spectrum inversion-elimination unit 42 of the noise elimination unit 40 generates a first spectrum by subtracting the inverted noise from the spectrum of the upper-sideband signal spectrum or the lower-sideband signal spectrum, the spectrum being present in a band on the side of the frequency corresponding to the second frequency with reference to the origin. The frequency corresponding to the second frequency here corresponds to a center frequency B in the graph (lower graph) of the upper-sideband signal spectrum in FIG. 2B. Further, the band on the side of the frequency corresponding to the second frequency with respect to the origin corresponds to the band of the graph (lower graph) of the upper-sideband signal spectrum including the center frequency B in FIG. 2B. Here, in a case where the carrier frequency of the double-sideband amplitude modulation signal is fr and the second frequency is f2, the center frequency B is f2-fr.

The spectrum inversion-elimination unit 42 of the noise elimination unit 40 inverts, in the upper-sideband signal spectrum or the lower-sideband signal spectrum calculated by the spectrum calculation unit 30*b*, the noise of the inverter noise that is present in the band on the opposite side to the band on the side of the origin corresponding to the carrier frequency of the double-sideband amplitude modulation signal with respect to the frequency corresponding to the second frequency to the side of the origin with the frequency corresponding to the second frequency as the center. The band on the opposite side to the band on the side of the origin corresponding to the carrier frequency of the double-sideband amplitude modulation signal with reference to the frequency corresponding to the second frequency here corresponds to the band on the right side of the center frequency B in the graph (lower graph) of the upper-sideband signal spectrum in FIG. 2B.

The spectrum inversion-elimination unit 42 of the noise elimination unit 40 generates a second spectrum by subtracting the inverted noise from the spectrum of the upper-sideband signal spectrum or the lower-sideband signal spectrum, the spectrum being present in the band on the side of the frequency corresponding to the second frequency with reference to the origin.

The spectrum inversion-elimination unit 42 of the noise elimination unit 40 generates a noise-eliminated spectrum on the basis of the generated first spectrum and the generated second spectrum. More specifically, in the first embodiment, the noise elimination unit 40 generates the noise-eliminated spectrum by comparing, for each frequency, at least two or more of the power values of the generated first spectrum and the generated second spectrum and the power value of the in-phase signal spectrum generated by the discrete Fourier transform unit 30*a* and extracting the lowest power value for each frequency. As a result, as indicated by the noise-eliminated spectrum in FIG. 2C, the noise superimposed on the signal component is eliminated. Note that it is only required that the noise indicating a frequency spectrum with symmetry is superimposed on a reception signal, and the reception signal is not limited to the double-sideband amplitude modulation signal. For example, the reception signal may be a reception signal other than the double-sideband amplitude modulation signal from radio broadcasting or television broadcasting. In this case, the noise elimination unit 40 eliminates the noise superimposed on a reception signal other than the double-sideband amplitude modulation signal from radio broadcasting or television broadcasting.

Figure 3:
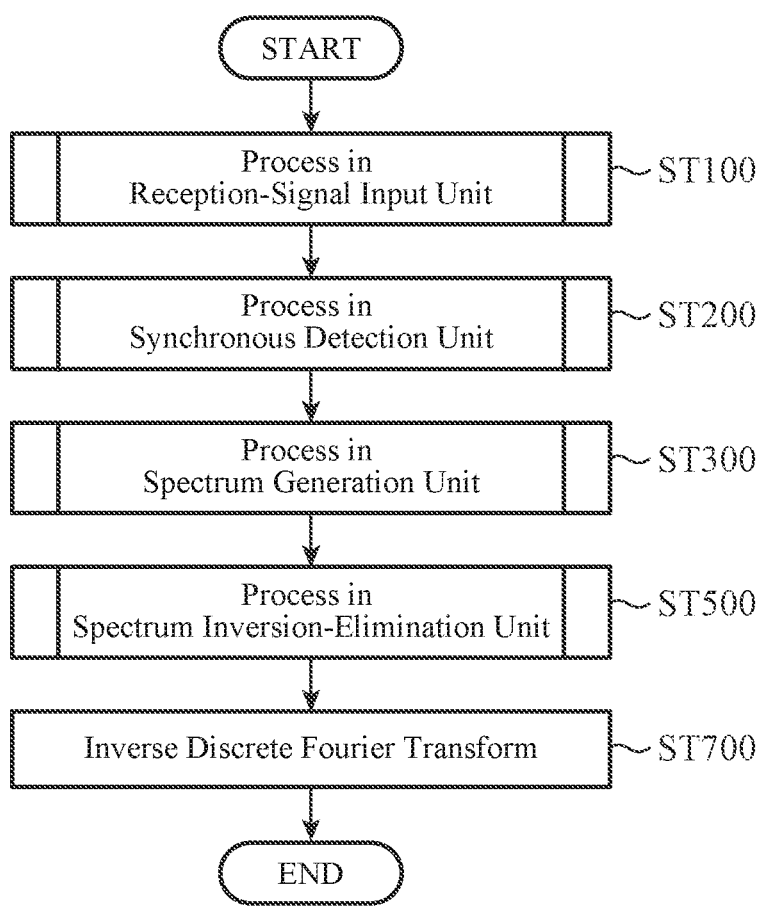
FIG. 3 is a flowchart illustrating a noise elimination method performed by the antenna device according to the first embodiment.

Hereinafter, an operation of the antenna device 100 according to the first embodiment will be described with reference to the drawings. FIG. 3 is a flowchart illustrating a noise elimination method performed by the antenna device 100 according to the first embodiment.

First, the reception-signal input unit 10 acquires a double-sideband amplitude modulation signal by receiving a double-sideband amplitude modulation wave (step ST100). The reception-signal input unit 10 outputs the acquired double-sideband amplitude modulation signal to the synchronous detection unit 20 of the noise elimination device 101.

Next, the synchronous detection unit 20 generates an in-phase signal and a quadrature signal by performing synchronous detection on the double-sideband amplitude modulation signal acquired by the reception-signal input unit 10 (step ST200). The synchronous detection unit 20 outputs the generated in-phase signal and the generated quadrature signal to the spectrum generation unit 30.

Next, in step ST300, the discrete Fourier transform unit 30*a* of the spectrum generation unit 30 generates an in-phase signal spectrum by performing discrete Fourier transform on the in-phase signal generated by the synchronous detection unit 20, and generates a quadrature signal spectrum by performing discrete Fourier transform on the quadrature signal generated by the synchronous detection unit 20. In addition, in step ST300, the spectrum calculation unit 30*b* of the spectrum generation unit 30 multiplies the quadrature signal spectrum generated by the discrete Fourier transform unit 30*a* by an imaginary unit. Moreover, in step ST300, the spectrum calculation unit 30*b* of the spectrum generation unit 30 calculates an upper-sideband signal spectrum by adding the quadrature signal spectrum to which the imaginary unit is multiplied to the in-phase signal spectrum generated by the discrete Fourier transform unit 30*a*. Furthermore, in step ST300, the spectrum calculation unit 30*b* of the spectrum generation unit 30 calculates a lower-sideband signal spectrum by subtracting the quadrature signal spectrum to which the imaginary unit is multiplied from the in-phase signal spectrum generated by the discrete Fourier transform unit 30*a*. The spectrum calculation unit 30*b* of the spectrum generation unit 30 outputs the calculated upper-sideband signal spectrum and the calculated lower-sideband signal spectrum to the noise elimination unit 40.

Next, the spectrum inversion-elimination unit 42 of the noise elimination unit 40 generates a noise-eliminated spectrum by performing noise elimination on the basis of the noise superimposed on at least one reception signal spectrum of the upper-sideband signal spectrum or the lower-sideband signal spectrum calculated by the spectrum calculation unit 30*b* (step ST500). The noise elimination unit 40 outputs the generated noise-eliminated spectrum to the IDFT 5.

Next, the IDFT 5 generates a time domain signal by performing inverse discrete Fourier transform on the noise-eliminated spectrum generated by the noise elimination unit 40 (step ST700).

Figure 4:
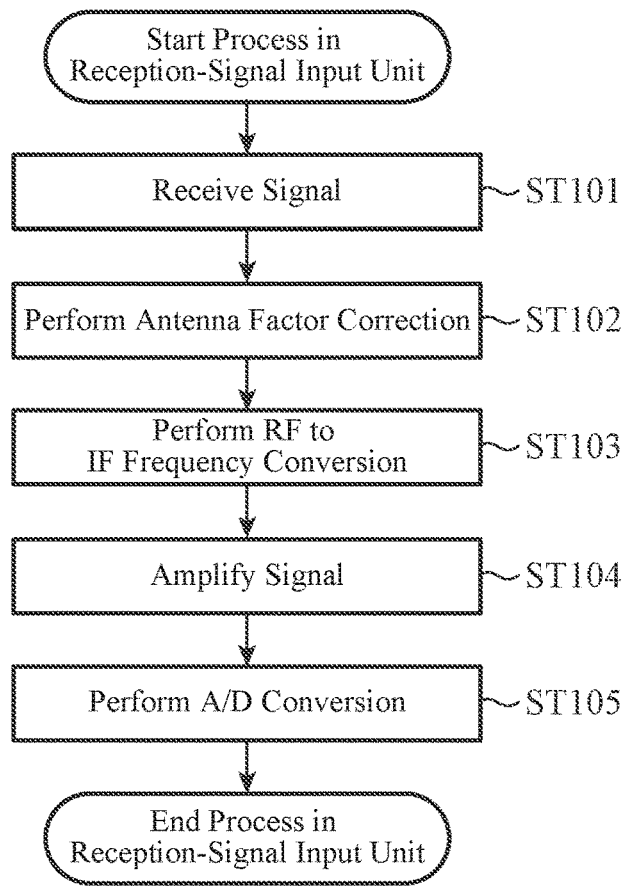
FIG. 4 is a flowchart illustrating a method of processing a double-sideband amplitude modulation signal performed by a reception-signal input unit of the antenna device according to the first embodiment.

Hereinafter, an operation of the reception-signal input unit 10 of the antenna device 100 according to the first embodiment will be described with reference to the drawings. FIG. 4 is a flowchart illustrating a method of processing a double-sideband amplitude modulation signal performed by the reception-signal input unit 10 of the antenna device 100 according to the first embodiment. Note that the following description of each step is a detailed description of step ST100 described above. Each of the following steps starts after the antenna 11 described above receives a double-sideband amplitude modulation wave.

First, the antenna 11 acquires a double-sideband amplitude modulation signal by receiving a double-sideband amplitude modulation wave (step ST101). The antenna 11 outputs the acquired double-sideband amplitude modulation signal to the antenna-factor correction unit 12.

Next, the antenna-factor correction unit 12 corrects the double-sideband amplitude modulation signal acquired by the antenna 11 in such a manner that the antenna factor of the antenna 11 is constant (step ST102). The antenna-factor correction unit 12 outputs the corrected double-sideband amplitude modulation signal to the frequency conversion unit 13.

The frequency conversion unit 13 performs frequency conversion on the double-sideband amplitude modulation signal (RF band) corrected by the antenna-factor correction unit 12 into an IF band signal (step ST103). The frequency conversion unit 13 outputs the frequency-converted double-sideband amplitude modulation signal to the amplification unit 14.

The amplification unit 14 amplifies the double-sideband amplitude modulation signal subjected to the frequency conversion by the frequency conversion unit 13 (step ST104). The amplification unit 14 outputs the amplified double-sideband amplitude modulation signal to the ADC 15.

The ADC 15 converts the double-sideband amplitude modulation signal amplified by the amplification unit 14 from an analog signal to a digital signal (step ST105). The ADC 15 outputs the double-sideband amplitude modulation signal converted into the digital signal to the synchronous detection unit 20.

Figure 5:
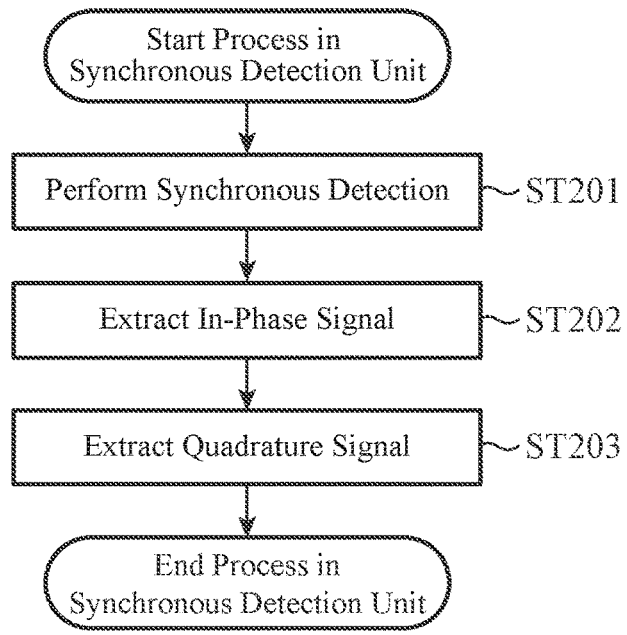
FIG. 5 is a flowchart illustrating a synchronous detection method performed by the synchronous detection unit according to the first embodiment.

Hereinafter, an operation of the synchronous detection unit 20 of the noise elimination device 101 according to the first embodiment will be described with reference to the drawings. FIG. 5 is a flowchart illustrating a synchronous detection method performed by the synchronous detection unit 20 according to the first embodiment. Note that the following description of each step is a detailed description of step ST200 described above. Each of the following steps starts after step ST105 described above.

First, the NCO 22 outputs a signal that has the same frequency and the same phase as the frequency and the phase of the carrier of the double-sideband amplitude modulation signal, and the multiplier 21 performs synchronous detection by multiplying the signal output by the NCO 22 by the double-sideband amplitude modulation signal (step ST201). The multiplier 21 outputs the double-sideband amplitude modulation signal subjected to the synchronous detection to the in-phase-signal extraction unit 23 and the quadrature-signal extraction unit 24.

Next, the in-phase-signal extraction unit 23 extracts an in-phase signal from the double-sideband amplitude modulation signal on which the synchronous detection is performed by the multiplier 21 (step ST202). The in-phase-signal extraction unit 23 outputs the extracted in-phase signal to the spectrum generation unit 30.

Next, the quadrature-signal extraction unit 24 extracts a quadrature signal from the double-sideband amplitude modulation signal on which the synchronous detection is performed by the multiplier 21 (step ST203). The quadrature-signal extraction unit 24 outputs the extracted quadrature signal to the spectrum generation unit 30.

Figure 6:
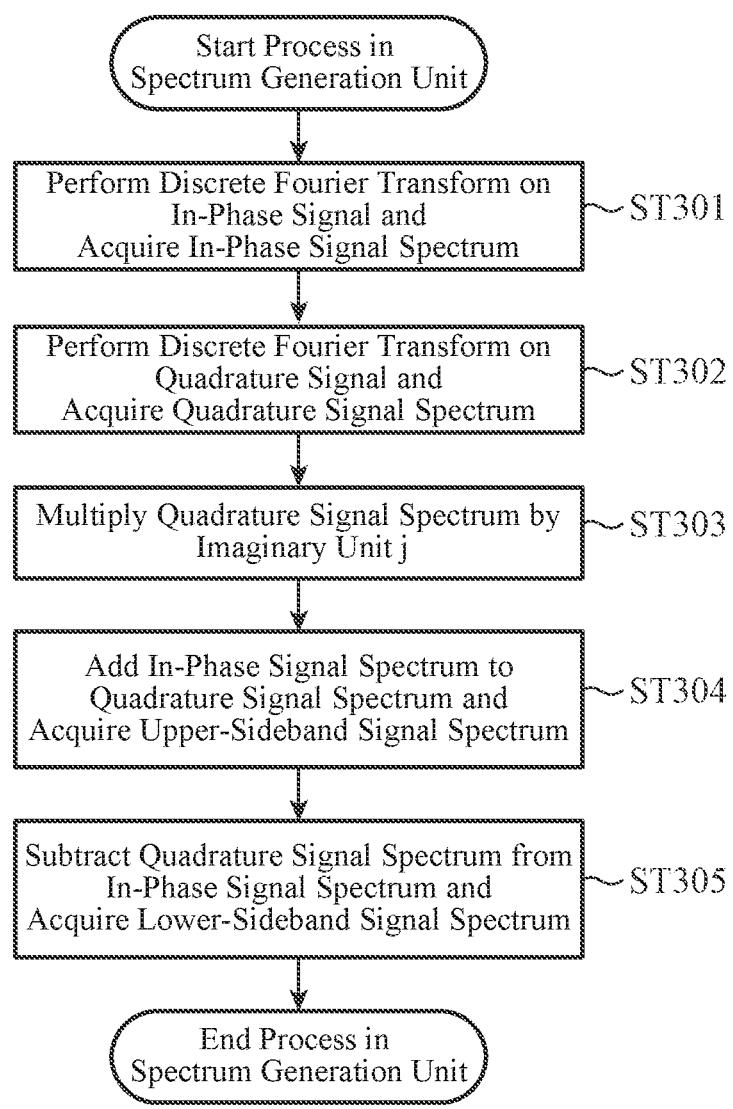
FIG. 6 is a flowchart illustrating a spectrum generation method performed by a spectrum generation unit according to the first embodiment.

Hereinafter, an operation of the spectrum generation unit 30 of the noise elimination device 101 according to the first embodiment will be described with reference to the drawings. FIG. 6 is a flowchart illustrating a spectrum generation method performed by the spectrum generation unit 30 according to the first embodiment. Note that the following description of each step is a detailed description of step ST300 described above. Each of the following steps starts after step ST203 described above.

The DFT 31*a* generates an in-phase signal spectrum by performing discrete Fourier transform on the in-phase signal extracted by the in-phase-signal extraction unit 23 (step ST301). The DFT 31*a* outputs the generated in-phase signal spectrum to the spectrum calculation unit 30*b* and the noise elimination unit 40.

The DFT 31*b* generates a quadrature signal spectrum by performing discrete Fourier transform on the quadrature signal extracted by the quadrature-signal extraction unit 24 (step ST302). The DFT 31*b* outputs the generated quadrature signal spectrum to the spectrum calculation unit 30*b*.

The multiplier 32 multiplies the quadrature signal spectrum generated by the DFT 31*b* by an imaginary unit (step ST303). The multiplier 32 outputs the quadrature signal spectrum to which the imaginary unit is multiplied to the adder 33*b* and the adder 33*a*.

The adder 33*b* calculates an upper-sideband signal spectrum by adding the quadrature signal spectrum to which the imaginary unit is multiplied by the multiplier 32 to the in-phase signal spectrum generated by the DFT 31*a* (step ST304). The adder 33*b* outputs the calculated upper-sideband signal spectrum to the noise elimination unit 40.

The adder 33*a* calculates a lower-sideband signal spectrum by subtracting the quadrature signal spectrum to which the imaginary unit is multiplied by the multiplier 32 from the in-phase signal spectrum generated by the DFT 31*a* (step ST305). The adder 33*a* outputs the calculated lower-sideband signal spectrum to the noise elimination unit 40.

Figure 7:
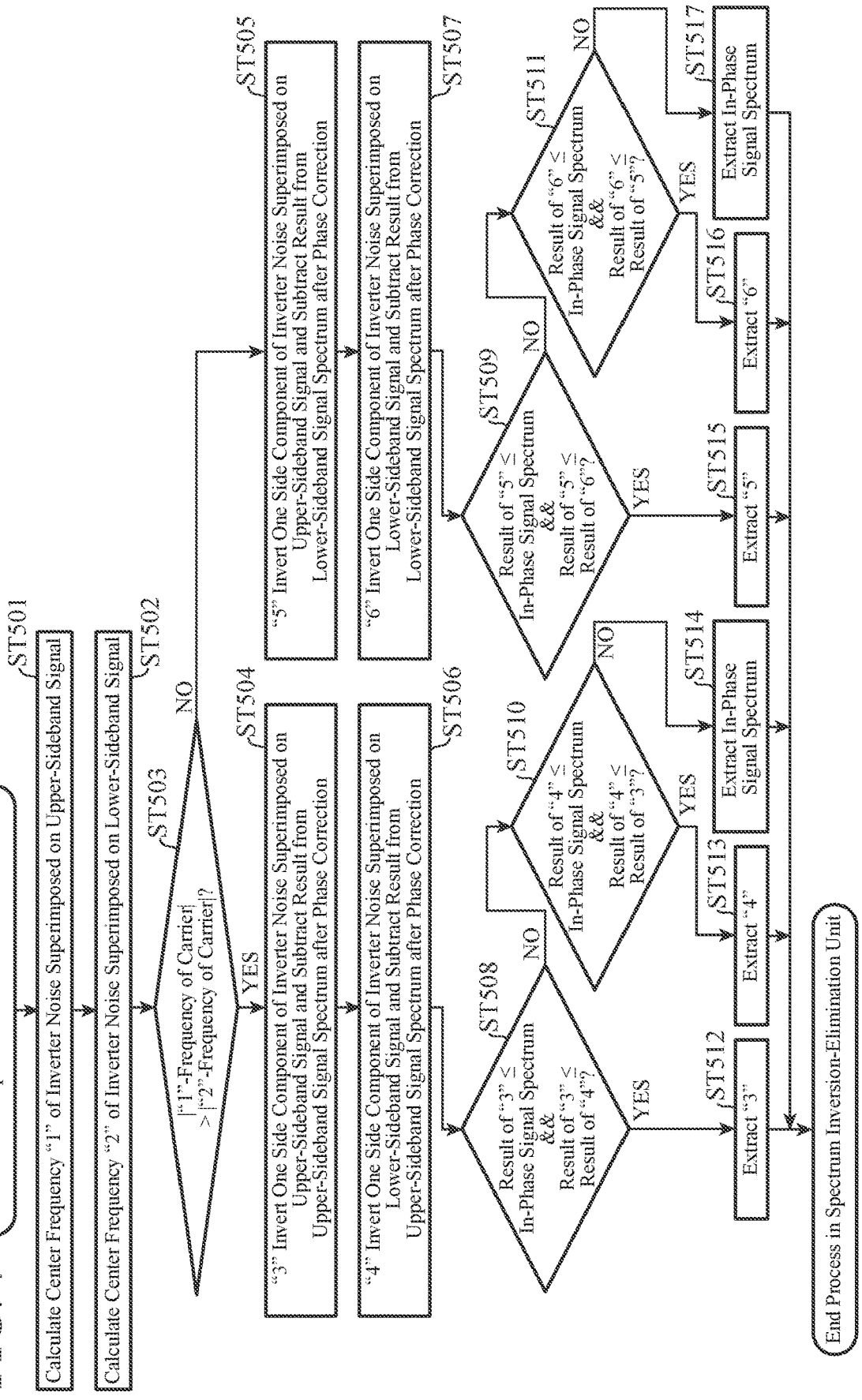
FIG. 7 is a flowchart illustrating a noise elimination method performed by the noise elimination unit according to the first embodiment.

Hereinafter, an operation of the spectrum inversion-elimination unit 42 of the noise elimination unit 40 in the noise elimination device 101 according to the first embodiment will be described with reference to the drawings. FIG. 7 is a flowchart illustrating a noise elimination method performed by the noise elimination unit 40 according to the first embodiment. Note that the following description of each step is a detailed description of step ST500 described above.

Each of the following steps starts after step ST305 described above. Note that it is assumed in the following description that the inverter noise with the first frequency is superimposed on the upper-sideband signal spectrum and the inverter noise with the second frequency is superimposed on the lower-sideband signal spectrum. In addition, it is assumed in the following description that it is undetermined which of the first frequency and the second frequency is closer to the carrier frequency of the double-sideband amplitude modulation signal. Furthermore, it is assumed that the carrier frequency of the inverter 7 used in each step below is set in advance or is acquired from any one of the inverter carrier frequency detecting unit 6 and the inverter carrier frequency acquiring communication unit 8.

In step ST501, the spectrum inversion-elimination unit 42 calculates a frequency (center frequency of inverter noise) corresponding to the first frequency in the inverter noise superimposed on the upper-sideband signal spectrum calculated by the spectrum calculation unit 30*b*.

Next, the spectrum inversion-elimination unit 42 calculates a frequency (center frequency of inverter noise) corresponding to the second frequency in the inverter noise superimposed on the lower-sideband signal spectrum calculated by the spectrum calculation unit 30*b* (step ST502).

Next, the spectrum inversion-elimination unit 42 determines whether or not the absolute value of the frequency corresponding to the first frequency in the upper-sideband signal spectrum calculated by the spectrum calculation unit 30*b* is larger than the absolute value of the frequency corresponding to the second frequency in the lower-sideband signal spectrum calculated by the spectrum calculation unit 30*b* (step ST503).

If the spectrum inversion-elimination unit 42 determines that the absolute value of the frequency (center frequency) corresponding to the first frequency is larger (YES in step ST503), in step ST504, the spectrum inversion-elimination unit 42 inverts, in the upper-sideband signal spectrum calculated by the spectrum calculation unit 30*b*, the noise of the inverter noise that is present in the band on the opposite side to the band on the side of the origin corresponding to the carrier frequency of the double-sideband amplitude modulation signal with respect to the frequency corresponding to the first frequency to the side of the origin with the frequency corresponding to the first frequency as the center. In addition, the spectrum inversion-elimination unit 42 generates a first spectrum by subtracting the inverted noise from the upper-sideband signal spectrum that is a spectrum of the upper-sideband signal spectrum or the lower-sideband signal spectrum, the spectrum being present in the band on the side of the frequency corresponding to the first frequency with respect to the origin, after phase correction.

Next, in step ST506, the spectrum inversion-elimination unit 42 inverts, in the lower-sideband signal spectrum calculated by the spectrum calculation unit 30*b*, the noise of the inverter noise that is present in the band on the opposite side to the band on the side of the origin corresponding to the carrier frequency of the double-sideband amplitude modulation signal with respect to the frequency corresponding to the second frequency to the side of the origin with the frequency corresponding to the second frequency as the center. In addition, in step ST506, the spectrum inversion-elimination unit 42 generates a second spectrum by subtracting the inverted noise from the upper-sideband signal spectrum that is a spectrum of the upper-sideband signal spectrum or the lower-sideband signal spectrum, the spectrum being present in the band on the side of the frequency corresponding to the first frequency with respect to the origin, after phase correction.

If the spectrum inversion-elimination unit 42 determines in step ST503 described above that the absolute value of the frequency (center frequency) corresponding to the first frequency is smaller (NO in step ST503), in step ST505, the spectrum inversion-elimination unit 42 inverts, in the upper-sideband signal spectrum calculated by the spectrum calculation unit 30*b*, the noise of the inverter noise that is present in the band on the opposite side to the band on the side of the origin corresponding to the carrier frequency of the double-sideband amplitude modulation signal with respect to the frequency corresponding to the first frequency to the side of the origin with the frequency corresponding to the first frequency as the center. In addition, the spectrum inversion-elimination unit 42 generates a third spectrum by subtracting the inverted noise from the lower-sideband signal spectrum that is a spectrum of the upper-sideband signal spectrum or the lower-sideband signal spectrum, the spectrum being present in the band on the side of the frequency corresponding to the second frequency with respect to the origin, after phase correction.

Next, in step ST507, the spectrum inversion-elimination unit 42 inverts, in the lower-sideband signal spectrum calculated by the spectrum calculation unit 30*b*, the noise of the inverter noise that is present in the band on the opposite side to the band on the side of the origin corresponding to the carrier frequency of the double-sideband amplitude modulation signal with respect to the frequency corresponding to the second frequency to the side of the origin with the frequency corresponding to the second frequency as the center. In addition, in step ST507, the spectrum inversion-elimination unit 42 generates a fourth spectrum by subtracting the inverted noise from the lower-sideband signal spectrum that is a spectrum of the upper-sideband signal spectrum or the lower-sideband signal spectrum, the spectrum being present in the band on the side of the frequency corresponding to the second frequency with respect to the origin, after phase correction.

As a step next to step ST506, the spectrum inversion-elimination unit 42 determines, for each frequency, whether or not the power value of the generated first spectrum is equal to or less than the power value of the generated second spectrum and is also equal to or less than the power value of the in-phase signal spectrum generated by the discrete Fourier transform unit 30*a* (step ST508). That is, although not illustrated, step ST508 is repeatedly performed for each frequency. Therefore, steps ST512, ST510, ST513, and ST514 to be described below are also repeatedly performed for each frequency.

If the spectrum inversion-elimination unit 42 determines that the power value of the first spectrum is equal to or less than the power value of the second spectrum and is also equal to or less than the power value of the in-phase signal spectrum (YES in step ST508), the spectrum inversion-elimination unit 42 extracts the power value of the first spectrum (step ST512).

If the spectrum inversion-elimination unit 42 determines that the power value of the first spectrum is larger than the power value of the second spectrum and is also larger than the power value of the in-phase signal spectrum (NO in step ST508), the spectrum inversion-elimination unit 42 determines, for each frequency, whether or not the power value of the generated second spectrum is equal to or less than the power value of the in-phase signal spectrum generated by the discrete Fourier transform unit 30a and is also equal to or less than the power value of the generated first spectrum (step ST510).

If the spectrum inversion-elimination unit 42 determines that the power value of the second spectrum is equal to or less than the power value of the in-phase signal spectrum and is also equal to or less than the power value of the first spectrum (YES in step ST510), the spectrum inversion-elimination unit 42 extracts the power value of the second spectrum (step ST513).

If the spectrum inversion-elimination unit 42 determines that the power value of the second spectrum is larger than the power value of the in-phase signal spectrum and is also larger than the power value of the first spectrum (NO in step ST510), the spectrum inversion-elimination unit 42 extracts the power value of the in-phase signal spectrum generated by the discrete Fourier transform unit 30a (step ST514).

Although not illustrated, the spectrum inversion-elimination unit 42 generates a noise-eliminated spectrum using the power value extracted by repeatedly performing steps ST508, ST512, ST510, ST513, and ST514 for each frequency.

On the other hand, as a step next to step ST507, the spectrum inversion-elimination unit 42 determines, for each frequency, whether or not the power value of the generated third spectrum is equal to or less than the power value of the generated fourth spectrum and is also equal to or less than the power value of the in-phase signal spectrum generated by the discrete Fourier transform unit 30a (step ST509). That is, although not illustrated, step ST509 is repeatedly performed for each frequency. Therefore, steps ST515, ST511, ST516, and ST517 to be described below are also repeatedly performed for each frequency.

If the spectrum inversion-elimination unit 42 determines that the power value of the third spectrum is equal to or less than the power value of the fourth spectrum and is also equal to or less than the power value of the in-phase signal spectrum (YES in step ST509), the spectrum inversion-elimination unit 42 extracts the power value of the third spectrum (step ST515).

If the spectrum inversion-elimination unit 42 determines that the power value of the third spectrum is larger than the power value of the fourth spectrum and is also larger than the power value of the in-phase signal spectrum (NO in step ST509), the spectrum inversion-elimination unit 42 determines, for each frequency, whether or not the power value of the generated fourth spectrum is equal to or less than the power value of the in-phase signal spectrum generated by the discrete Fourier transform unit 30a and is also equal to or less than the power value of the generated third spectrum (step ST511).

If the spectrum inversion-elimination unit 42 determines that the power value of the fourth spectrum is equal to or less than the power value of the in-phase signal spectrum and is also equal to or less than the power value of the third spectrum (YES in step ST511), the spectrum inversion-elimination unit 42 extracts the power value of the fourth spectrum (step ST516).

If the spectrum inversion-elimination unit 42 determines that the power value of the fourth spectrum is larger than the power value of the in-phase signal spectrum and is also larger than the power value of the third spectrum (NO in step ST511), the spectrum inversion-elimination unit 42 extracts the power value of the in-phase signal spectrum generated by the discrete Fourier transform unit 30a (step ST517).

Although not illustrated, the spectrum inversion-elimination unit 42 generates a noise-eliminated spectrum using the power value extracted by repeatedly performing steps ST509, ST515, ST511, ST516, and ST517 for each frequency.

In the antenna device 100, the functions of the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the function of the spectrum inversion-elimination unit 42 in the noise elimination unit 40, and the functions of the IDFT 5, the inverter carrier frequency detecting unit 6, and the inverter carrier frequency acquiring communication unit 8 in the noise elimination device 101 are implemented by a processing circuit. That is, the antenna device 100 includes a processing circuit for performing the processes of the individual steps illustrated in FIGS. 3, 4, 5, 6, and 7. The processing circuit may be dedicated hardware, or may be a central processing unit (CPU) that executes a program stored in a memory.

Figure 8A:
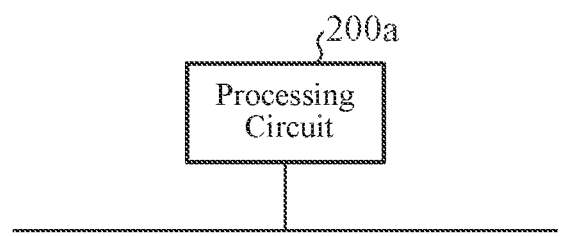
FIG. 8A is a block diagram illustrating a hardware configuration that implements functions of the antenna device.
Figure 8B:
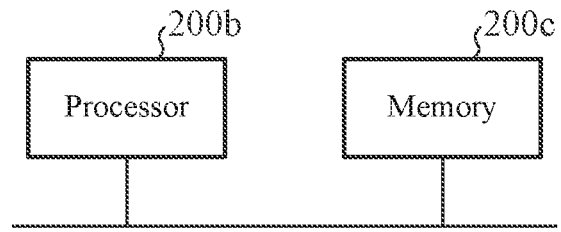
FIG. 8B is a block diagram illustrating a hardware configuration that executes software that implements the functions of the antenna device.

FIG. 8A is a block diagram illustrating a hardware configuration that implements the functions of the antenna device 100. FIG. 8B is a block diagram illustrating a hardware configuration that executes software that implements the functions of the antenna device 100.

In a case where the processing circuit is a processing circuit 200a of dedicated hardware illustrated in FIG. 8A, the processing circuit 200a corresponds to, for example, a single circuit, a composite circuit, a programmed processor, a parallel programmed processor, an application specific integrated circuit (ASIC), a field-programmable gate array (FPGA), or a combination thereof.

In the antenna device 100, the functions of the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the function of the spectrum inversion-elimination unit 42 in the noise elimination unit 40, and the functions of the IDFT 5, the inverter carrier frequency detecting unit 6, and the inverter carrier frequency acquiring communication unit 8 in the noise elimination device 101 may be implemented by separate processing circuits, or these functions may be collectively implemented by one processing circuit.

In a case where the processing circuit is a processor 200b illustrated in FIG. 8B, in the antenna device 100, the functions of the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the function of the spectrum inversion-elimination unit 42 in the noise elimination unit 40, and the functions of the IDFT 5, the inverter carrier frequency detecting unit 6, and the inverter carrier frequency acquiring communication unit 8 in the noise elimination device 101 are implemented by software, firmware, or a combination of software and firmware.

Note that the software or firmware is described as a program and stored in a memory 200c.

By reading and executing the program stored in the memory 200c, the processor 200b implements, in the antenna device 100, the functions of the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the function of the spectrum inversion-elimination unit 42 in the noise elimination unit 40, and the functions of the IDFT 5, the inverter carrier frequency detecting unit 6, and the inverter carrier frequency acquiring communication unit 8 in the noise elimination device 101. That is, the antenna device 100 includes the memory 200c that stores a program that results in performing the processes of the individual steps illustrated in FIGS. 3, 4, 5, 6, and 7 when these functions are performed by the processor 200b.

These programs cause a computer to perform, in the antenna device 100, the procedures or methods performed by the antenna-factor correction unit 12, the frequency conversion unit 13, the amplification unit 14, and the ADC 15 in the reception-signal input unit 10, and the procedures or methods performed by the multiplier 21, the NCO 22, the in-phase-signal extraction unit 23, and the quadrature-signal extraction unit 24 in the synchronous detection unit 20, the procedures or methods performed by the DFT 31a and the DFT 31b of the discrete Fourier transform unit 30a in the spectrum generation unit 30, the procedures or methods performed by the multiplier 32, the adder 33b, and the adder 33a in the spectrum generation unit 30, the procedure or method performed by the spectrum inversion-elimination unit 42 in the noise elimination unit 40, and the procedures or methods performed by the IDFT 5, the inverter carrier frequency detecting unit 6, and the inverter carrier frequency acquiring communication unit 8 in the noise elimination device 101. The memory 200c may be a computer-readable storage medium that stores a program that causes a computer to function as, in the antenna device 100, the antenna-factor correction unit 12, the frequency conversion unit 13, the amplification unit 14, and the ADC 15 in the reception-signal input unit 10, and the multiplier 21, the NCO 22, the in-phase-signal extraction unit 23, and the quadrature-signal extraction unit 24 in the synchronous detection unit 20, the DFT 31a and the DFT 31b of the discrete Fourier transform unit 30a in the spectrum generation unit 30, the multiplier 32, the adder 33b, and the adder 33a in the spectrum generation unit 30, the spectrum inversion-elimination unit 42 in the noise elimination unit 40, the IDFT 5, the inverter carrier frequency detecting unit 6, and the inverter carrier frequency acquiring communication unit 8 in the noise elimination device 101.

The processor 200b corresponds to, for example, a central processing unit (CPU), a processing device, an arithmetic device, a processor, a microprocessor, a microcomputer, a digital signal processor (DSP), or the like.

The memory 200c corresponds to, for example, a non-volatile or volatile semiconductor memory such as a random access memory (RAM), a read only memory (ROM), a flash memory, an erasable programmable read only memory (EPROM), or an electrically-EPROM (EEPROM); a magnetic disk such as a hard disk or a flexible disk, a flexible dis; an optical disk, a compact disk, a mini disk, a compact disc (CD), a digital versatile disc (DVD), or the like.

Some of the functions of, in the antenna device 100, the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the function of the spectrum inversion-elimination unit 42 in the noise elimination unit 40, and the functions of the IDFT 5, the inverter carrier frequency detecting unit 6, and the inverter carrier frequency acquiring communication unit 8 in the noise elimination device 101 may be implemented by dedicated hardware, and some may be implemented by software or firmware.

For example, the functions of the antenna-factor correction unit 12, the frequency conversion unit 13, the amplification unit 14, and the ADC 15 in the reception-signal input unit 10 are implemented by a processing circuit as dedicated hardware. In the noise elimination device 101, the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the function of the spectrum inversion-elimination unit 42 in the noise elimination unit 40, and the functions of the IDFT 5, the inverter carrier frequency detecting unit 6, and the inverter carrier frequency acquiring communication unit 8 may be implemented by the processor 200b reading and executing the program stored in the memory 200c.

As described above, the processing circuit can implement each of the functions by hardware, software, firmware, or a combination thereof.

As described above, the noise elimination device 101 according to the first embodiment includes the synchronous detection unit 20 (detection unit) that detects a reception signal, the discrete Fourier transform unit 30a that generates a reception signal spectrum by performing discrete Fourier transform on a complex detection output of the synchronous detection unit 20, and the noise elimination unit 40 that generates a noise-eliminated spectrum by performing noise elimination on the basis of the noise superimposed on the reception signal spectrum. The noise superimposed on the reception signal spectrum indicates a frequency spectrum with symmetry, and the noise elimination unit 40 generates the noise-eliminated spectrum by performing noise elimination on the basis of the symmetry of the noise superimposed on the reception signal spectrum.

According to the configuration described above, noise elimination can be suitably performed on the basis of the symmetry of noise. As a result, it is possible to suppress a decrease in the accuracy of noise elimination.

Further, in the noise elimination device 101 according to the first embodiment, the reception signal detected by the synchronous detection unit 20 (detection unit) is a double-sideband amplitude modulation signal, the synchronous detection unit 20 generates an in-phase signal and a quadrature signal by multiplying the double-sideband amplitude modulation signal by a signal synchronized with the carrier of the double-sideband amplitude modulation signal, the discrete Fourier transform unit 30a generates an in-phase signal spectrum by performing discrete Fourier transform on the in-phase signal generated by the synchronous detection unit 20, and generates a quadrature signal spectrum by performing discrete Fourier transform on the quadrature signal generated by the synchronous detection unit 20, the spectrum calculation unit 30b is further included in which an upper-sideband signal spectrum is calculated by multiplying the quadrature signal spectrum by an imaginary unit and adding the quadrature signal spectrum to which the imaginary unit is multiplied to the in-phase signal spectrum, and a lower-sideband signal spectrum is calculated by subtracting the quadrature signal spectrum to which the imaginary unit is multiplied from the in-phase signal spectrum generated by the discrete Fourier transform unit 30a. The noise superimposed on the upper-sideband signal spectrum and the lower-sideband signal spectrum indicates a frequency spectrum with symmetry, and the noise elimination unit 40 generates a noise-eliminated spectrum by performing noise elimination on the basis of the symmetry of the noise superimposed on at least one reception signal spectrum of the upper-sideband signal spectrum or the lower-sideband signal spectrum calculated by the spectrum calculation unit 30b.

According to the configuration described above, since the upper-sideband signal spectrum and the lower-sideband signal spectrum are each generated on the basis of both the in-phase signal and the quadrature signal, the noise corresponding to a symmetric noise appears in both the upper-sideband signal spectrum and the lower-sideband signal spectrum. As a result, it is possible to perform noise elimination on the basis of the symmetry of the noise superimposed on the reception signal spectrum of at least one of the upper-sideband signal spectrum or the lower-sideband signal spectrum. Therefore, it is possible to suppress a decrease in the accuracy of noise elimination. Furthermore, for example, in a case where the double-sideband amplitude modulation signal is an audio signal, noise superimposed on the audio signal can be suitably removed while a degradation of the audio signal is prevented. Note that it is only required that the noise indicating a frequency spectrum with symmetry is superimposed on a reception signal, and the reception signal is not limited to the double-sideband amplitude modulation signal. For example, the reception signal may be a reception signal other than the double-sideband amplitude modulation signal from radio broadcasting or television broadcasting. In this case, the noise elimination unit 40 eliminates the noise superimposed on a reception signal other than the double-sideband amplitude modulation signal from radio broadcasting or television broadcasting.

Furthermore, in the noise elimination device 101 according to the first embodiment, the noise superimposed on the upper-sideband signal spectrum and the lower-sideband signal spectrum is inverter noise indicating a frequency spectrum with symmetry, and the noise elimination unit 40 generates a first spectrum by extracting a first frequency closest to the carrier frequency of the double-sideband amplitude modulation signal and a second frequency second closest to the carrier frequency of the double-sideband amplitude modulation signal from frequencies of integer multiples of the carrier frequency of the inverter 7 that is the source of generation of the inverter noise, and inverting, in the upper-sideband signal spectrum or the lower-sideband signal spectrum, noise of the inverter noise that is present in a band on the opposite side to a band on the side of the origin corresponding to the carrier frequency of the double-sideband amplitude modulation signal with respect to a frequency corresponding to the first frequency to the side of the origin with the frequency corresponding to the first frequency as the center, and subtracting the inverted noise from a spectrum of the upper-sideband signal spectrum or the lower-sideband signal spectrum, the spectrum being present in a band on a side of a frequency corresponding to the second frequency with reference to the origin. In addition, the noise elimination unit 40 generates a second spectrum by inverting, in the upper-sideband signal spectrum or the lower-sideband signal spectrum, noise of the inverter noise that is present on the opposite side to the band on the side of the origin corresponding to the carrier frequency of the double-sideband amplitude modulation signal with respect to a frequency corresponding to the second frequency to the side of the origin with the frequency corresponding to the second frequency as the center and subtracting the inverted noise from a spectrum of the upper-sideband signal spectrum or the lower-sideband signal spectrum, the spectrum being present in the band on the side of the frequency corresponding to the second frequency with respect to the origin, and then generates a noise-eliminated spectrum on the basis of the first spectrum and the second spectrum.

According to the configuration described above, the first spectrum and the second spectrum are generated by performing noise elimination on the basis of the symmetry of the inverter noise. More specifically, since the first spectrum and the second spectrum are generated on the basis of a spectrum that is present in the band on the side of the frequency corresponding to the second frequency farther from the origin than the first frequency, there is a low possibility that noise is included in the spectrum. That is, noise elimination can be suitably performed on the basis of the symmetry of the inverter noise. As a result, it is possible to improve the accuracy of noise elimination.

In addition, the noise elimination unit 40 in the noise elimination device 101 according to the first embodiment generates the noise-eliminated spectrum by comparing, for each frequency, at least two or more of the power values of the generated first spectrum and the generated second spectrum and the power value of the in-phase signal spectrum generated by the discrete Fourier transform unit 30a and extracting the lowest power value for each frequency.

According to the configuration described above, the lower the power value, the less the possibility that the noise is included in the spectrum. Therefore, it is possible to reduce the possibility that the noise is included in a noise-eliminated spectrum finally generated. As a result, it is possible to improve the accuracy of noise elimination.

Furthermore, the noise elimination device 101 according to the first embodiment includes the inverter carrier frequency detecting unit 6 that detects the carrier frequency of the inverter 7 by referring to the upper-sideband signal spectrum and the lower-sideband signal spectrum calculated by the spectrum calculation unit 30b.

According to the configuration described above, the first frequency and the second frequency of the inverter noise can be extracted on the basis of the detected carrier frequency of the inverter 7. That is, noise elimination can be suitably performed on the basis of the symmetry of the inverter noise. As a result, it is possible to improve the accuracy of noise elimination.

Furthermore, the noise elimination device 101 according to the first embodiment includes the inverter carrier frequency acquiring communication unit 8 that acquires information related to the carrier frequency of the inverter 7 from the inverter 7.

According to the configuration described above, the first frequency and the second frequency of the inverter noise can be extracted on the basis of the acquired carrier frequency of the inverter 7. That is, noise elimination can be suitably performed on the basis of the symmetry of the inverter noise. As a result, it is possible to improve the accuracy of noise elimination.

Moreover, in the noise elimination device 101 according to the first embodiment, the carrier frequency of the inverter 7 is set in advance.

According to the configuration described above, the first frequency and the second frequency of the inverter noise can be extracted on the basis of the preset carrier frequency of the inverter 7. That is, noise elimination can be suitably performed on the basis of the symmetry of the inverter noise. As a result, it is possible to improve the accuracy of noise elimination.

Furthermore, the synchronous detection unit 20 (detection unit) in the noise elimination device 101 according to the first embodiment includes the NCO 22 (numerically controlled oscillator) that outputs a signal synchronized with the carrier of a double-sideband amplitude modulation signal and the multiplier 21 that performs synchronous detection by multiplying the signal output from the NCO 22 (numerically controlled oscillator) by the double-sideband amplitude modulation signal.

According to the configuration described above, synchronous detection can be suitably performed.

Further, the noise elimination device 101 according to the first embodiment further includes the IDFT 5 (inverse discrete Fourier transform unit) that generates a time domain signal by performing inverse discrete Fourier transform on the noise-eliminated spectrum generated by the noise elimination unit 40.

According to the configuration described above, it is possible to suitably output information indicated by the double-sideband amplitude modulation signal on the basis of the generated time domain signal.

Moreover, the antenna device 100 according to the first embodiment includes the noise elimination device 101 and the reception-signal input unit 10 (reception unit) that acquires a reception signal.

According to the configuration described above, each of the effects described above can be achieved in the antenna device 100.

Furthermore, the reception-signal input unit 10 (reception unit) in the antenna device 100 according to the first embodiment includes the antenna 11 that acquires a reception signal and the antenna-factor correction unit 12 that corrects the reception signal acquired by the antenna 11 in such a manner that the antenna factor of the antenna 11 is constant.

According to the configuration described above, noise elimination can be suitably performed on the basis of the corrected double-sideband amplitude modulation signal.

In addition, the noise elimination method according to the first embodiment includes a detection step to detect a reception signal, a discrete Fourier transform step to generate a reception signal spectrum by performing discrete Fourier transform on a complex detection output in the detection step, and a noise elimination step to generate a noise-eliminated spectrum by performing noise elimination on the basis of the noise superimposed on the reception signal spectrum calculated in the discrete Fourier transform step. The noise superimposed on the reception signal spectrum indicates a frequency spectrum with symmetry, and in the noise elimination step, the noise-eliminated spectrum is generated by performing noise elimination on the basis of the symmetry of the noise superimposed on the reception signal spectrum.

According to the configuration described above, effects similar to the effects achieved by the noise elimination device 101 are achieved.

Second Embodiment

The first embodiment has described the configuration in which the noise elimination unit 40 includes the spectrum inversion-elimination unit 42. A configuration in which the noise elimination unit includes a spectrum amplitude comparing unit will be described in a second embodiment. Note that, in the second embodiment, noise other than the noise indicating a frequency spectrum with symmetry may be superimposed. That is, the noise superimposed on the upper-sideband signal spectrum and the lower-sideband signal spectrum calculated by the spectrum calculation unit 30*b* does not need to indicate a frequency spectrum with symmetry.

Hereinafter, the second embodiment will be described with reference to the drawings. Note that configurations with functions similar to those described in the first embodiment are denoted by the same reference numerals, and description thereof will be omitted.

Figure 9:
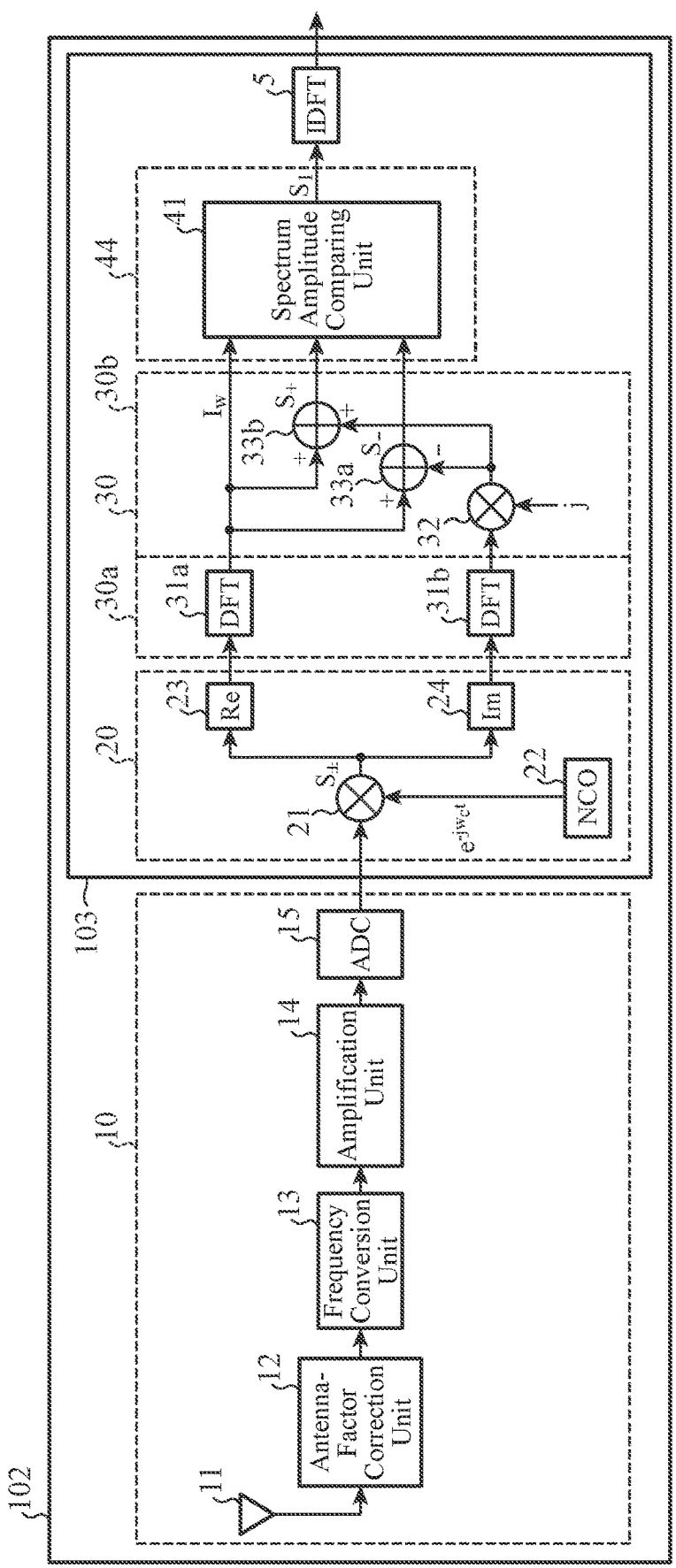
FIG. 9 is a block diagram illustrating a configuration of an antenna device according to a second embodiment.

FIG. 9 is a block diagram illustrating a configuration of an antenna device 102 according to the second embodiment. As illustrated in FIG. 9, as compared with the antenna device 100 according to the first embodiment, in the antenna device 102, a noise elimination unit 44 of a noise elimination device 103 includes a spectrum amplitude comparing unit 41 instead of the spectrum inversion-elimination unit 42. Furthermore, as compared with the antenna device 100 according to the first embodiment, the noise elimination device 103 of the antenna device 102 does not include the inverter carrier frequency detecting unit 6 and the inverter carrier frequency acquiring communication unit 8.

The noise elimination unit 44 according to the second embodiment generates a noise-eliminated spectrum by performing noise elimination on the basis of the noise superimposed on at least one spectrum of an upper-sideband signal spectrum or a lower-sideband signal spectrum calculated by the spectrum calculation unit 30*b*.

The spectrum amplitude comparing unit 41 of the noise elimination unit 44 generates the noise-eliminated spectrum by comparing, for each frequency, the power value of an in-phase signal spectrum generated by the discrete Fourier transform unit 30*a* with at least one or more of the power values of the upper-sideband signal spectrum and the lower-sideband signal spectrum calculated by the spectrum calculation unit 30*b* and extracting the lowest power value for each frequency. The spectrum amplitude comparing unit 41 outputs the generated noise-eliminated spectrum ($S_1$ in FIG. 9) to the IDFT 5.

More specifically, the spectrum amplitude comparing unit 41 may compare, for each frequency, the power value of the in-phase signal spectrum generated by the discrete Fourier transform unit 30*a* with the power value of the upper-sideband signal spectrum calculated by the spectrum calculation unit 30*b*, and extract the lowest power value for each frequency. Alternatively, the spectrum amplitude comparing unit 41 may compare, for each frequency, the power value of the in-phase signal spectrum generated by the discrete Fourier transform unit 30*a* with the power value of the lower-sideband signal spectrum calculated by the spectrum calculation unit 30b, and extract the lowest power value for each frequency.

As described above, in a double-sideband amplitude modulation signal on which symmetric noise is superimposed, the noise does not appear in an in-phase signal spectrum, but may appear in a quadrature signal spectrum. In this case, the power value of the in-phase signal spectrum that does not include the symmetric noise is the lowest power value, and thus the spectrum amplitude comparing unit 41 can extract the power value of the in-phase signal spectrum that does not include the symmetric noise by performing comparison and extraction using the in-phase signal spectrum as described above. As a result, it is possible to suppress a decrease in the accuracy of noise elimination.

Figure 10C:
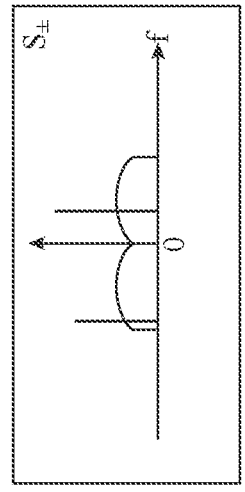
FIG. 10C is a graph illustrating a noise-eliminated spectrum generated by a spectrum amplitude comparing unit of a noise elimination unit according to the second embodiment.
Figure 10B:
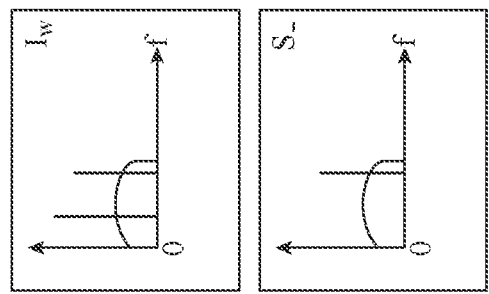
FIG. 10B illustrates a graph of an in-phase signal spectrum generated by a DFT of a discrete Fourier transform unit according to the second embodiment, a graph of a lower-sideband signal spectrum calculated by an adder of a spectrum calculation unit according to the second embodiment, and a graph of an upper-sideband signal spectrum calculated by the adder of the spectrum calculation unit according to the second embodiment.
Figure 10A:
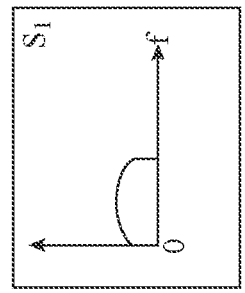
FIG. 10A is a graph illustrating a frequency domain spectrum obtained by performing discrete Fourier transform on a double-sideband amplitude modulation signal on which synchronous detection is performed by a multiplier of a synchronous detection unit according to the second embodiment.

Hereinafter, a more specific function of the noise elimination unit 44 will be described with reference to the drawings. FIG. 10A is a graph illustrating a frequency domain spectrum obtained by performing discrete Fourier transform on a double-sideband amplitude modulation signal on which synchronous detection is performed by the multiplier 21 of the synchronous detection unit 20 according to the second embodiment. FIG. 10B illustrates a graph (upper graph) of an in-phase signal spectrum generated by the DFT 31a of the discrete Fourier transform unit 30a according to the second embodiment, a graph (middle graph) of a lower-sideband signal spectrum calculated by the adder 33a of the spectrum calculation unit 30b according to the second embodiment, and a graph (lower graph) of an upper-sideband signal spectrum calculated by the adder 33b of the spectrum calculation unit 30b according to the second embodiment. FIG. 10C is a graph illustrating a noise-eliminated spectrum generated by the spectrum amplitude comparing unit 41 of the noise elimination unit 44 according to the second embodiment. Note that, in the example described below, it is assumed that noise other than the symmetric noise is superimposed on a double-sideband amplitude modulation signal.

As illustrated in FIG. 10A, the noise is superimposed on each of the upper-sideband signal spectrum and the lower-sideband signal spectrum calculated by the spectrum calculation unit 30b according to the second embodiment (bar line in FIG. 10A). For example, the spectrum amplitude comparing unit 41 according to the second embodiment generates the noise-eliminated spectrum (FIG. 10C) by comparing, for each frequency, the power value (upper graph in FIG. 10B) of the in-phase signal spectrum generated by the discrete Fourier transform unit 30a, the power value (lower graph in FIG. 10B) of the upper-sideband signal spectrum, and the power value (middle graph in FIG. 10B) of the lower-sideband signal spectrum, the upper-sideband signal spectrum and the lower-sideband signal spectrum being calculated by the spectrum calculation unit 30b, and extracting the lowest power value for each frequency.

Hereinafter, an operation of the antenna device 102 according to the second embodiment will be described with reference to the drawings. Note that the operation of the antenna device 102 according to the second embodiment is similar to the operation of the antenna device 100 according to the first embodiment except that step ST400 is performed instead of step ST500 described above. Therefore, description of steps other than step ST400 is omitted.

Figure 11:
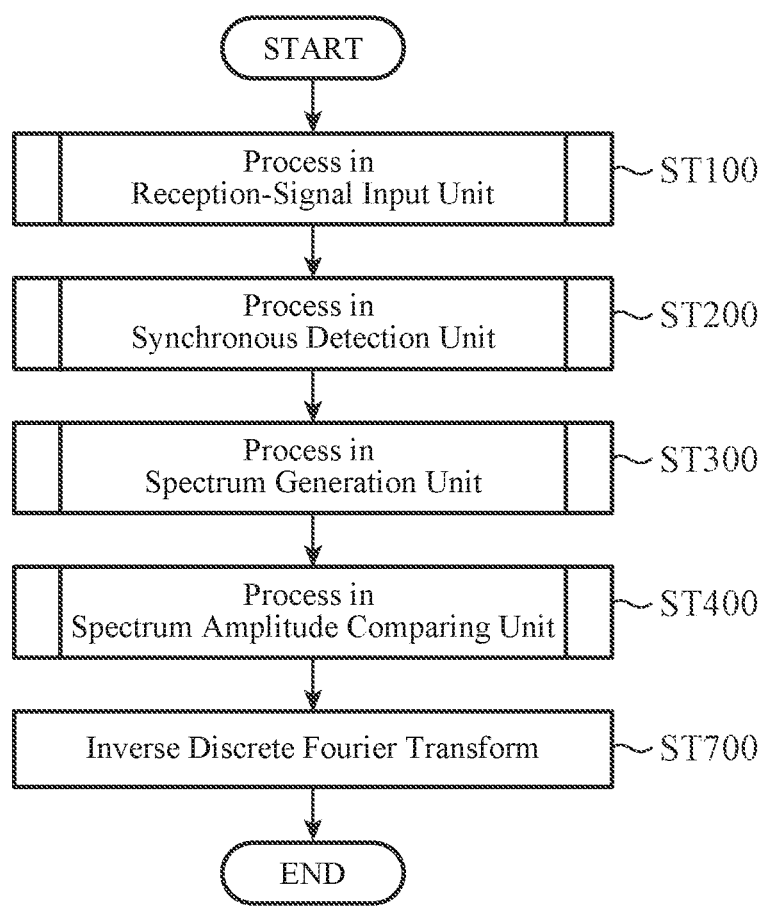
FIG. 11 is a flowchart illustrating a noise elimination method performed by the antenna device according to the second embodiment.

FIG. 11 is a flowchart illustrating a noise elimination method performed by the antenna device 102 according to the second embodiment. In step ST400, the spectrum amplitude comparing unit 41 generates the noise-eliminated spectrum by comparing, for each frequency, the power value of the in-phase signal spectrum generated by the discrete Fourier transform unit 30a with at least one or more of the power values of the upper-sideband signal spectrum and the lower-sideband signal spectrum calculated by the spectrum calculation unit 30b and extracting the lowest power value for each frequency.

Figure 12:
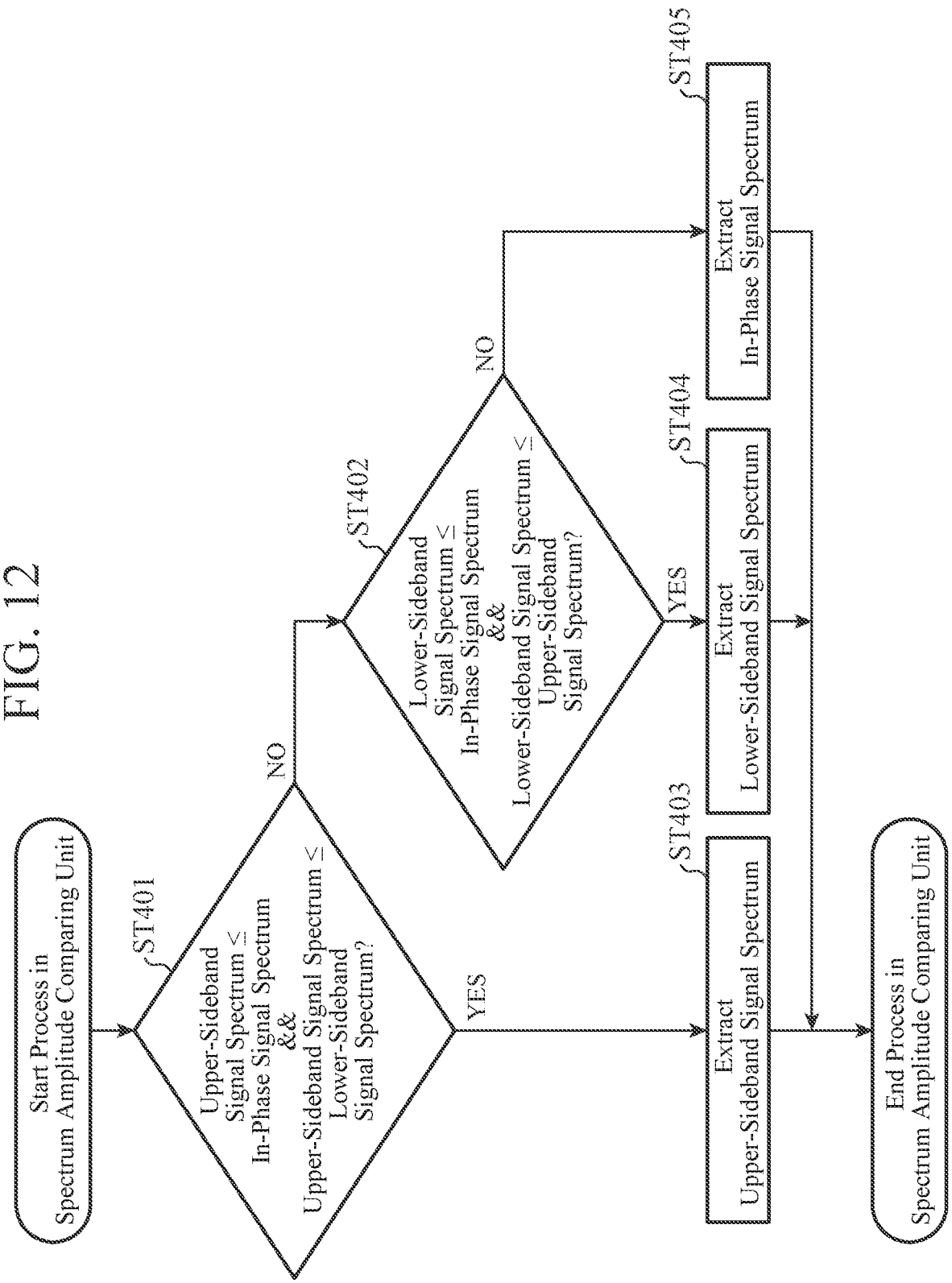
FIG. 12 is a flowchart illustrating a noise elimination method performed by the spectrum amplitude comparing unit according to the second embodiment.

Hereinafter, an operation of the spectrum amplitude comparing unit 41 of the noise elimination unit 44 in the noise elimination device 103 according to the second embodiment will be described with reference to the drawings. FIG. 12 is a flowchart illustrating a noise elimination method performed by the spectrum amplitude comparing unit 41 according to the second embodiment. Note that the following description of each step is a detailed description of step ST400 described above. Each of the following steps starts after step ST305 described above.

First, the spectrum amplitude comparing unit 41 determines, for each frequency, whether or not the power value of the upper-sideband signal spectrum calculated by the spectrum calculation unit 30b is equal to or less than the power value of the in-phase signal spectrum generated by the discrete Fourier transform unit 30a and is also equal to or less than the power value of the lower-sideband signal spectrum calculated by the spectrum calculation unit 30b (step ST401). That is, although not illustrated, step ST401 is repeatedly performed for each frequency. Therefore, steps from step ST402 to step ST405 to be described below are also repeatedly performed for each frequency.

If the spectrum amplitude comparing unit 41 determines that the power value of the upper-sideband signal spectrum is equal to or less than the power value of the in-phase signal spectrum and is also equal to or less than the power value of the lower-sideband signal spectrum (YES in step ST401), the spectrum amplitude comparing unit 41 extracts the power value of the upper-sideband signal spectrum (step ST403).

If the spectrum amplitude comparing unit 41 determines that the power value of the upper-sideband signal spectrum is larger than the power value of the in-phase signal spectrum and is also larger than the power value of the lower-sideband signal spectrum (NO in step ST401), the spectrum amplitude comparing unit 41 compares, for each frequency, whether or not the power value of the lower-sideband signal spectrum calculated by the spectrum calculation unit 30b is equal to or less than the power value of the in-phase signal spectrum generated by the discrete Fourier transform unit 30a and is also equal to or less than the power value of the upper-sideband signal spectrum calculated by the spectrum calculation unit 30b (step ST402).

If the spectrum amplitude comparing unit 41 determines that the power value of the lower-sideband signal spectrum is equal to or less than the power value of the in-phase signal spectrum and is also equal to or less than the power value of the upper-sideband signal spectrum (YES in step ST402), the spectrum amplitude comparing unit 41 extracts the power value of the lower-sideband signal spectrum (step ST404).

If the spectrum amplitude comparing unit 41 determines that the power value of the lower-sideband signal spectrum is larger than the power value of the in-phase signal spectrum and is also larger than the power value of the upper-sideband signal spectrum (NO in step ST402), the spectrum amplitude comparing unit 41 extracts the power value of the in-phase signal spectrum (step ST405).

Although not illustrated, the spectrum amplitude comparing unit 41 generates a noise-eliminated spectrum using the power value extracted by repeatedly performing the steps from step ST401 to step ST405 for each frequency.

In the antenna device 102, the functions of the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the function of the spectrum amplitude comparing unit 41 in the noise elimination unit 44, and the functions of the IDFT 5, the inverter carrier frequency detecting unit 6, and the inverter carrier frequency acquiring communication unit 8 in the noise elimination device 103 are implemented by a processing circuit. That is, the antenna device 102 includes a processing circuit for performing the processes of the individual steps illustrated in FIGS. 4, 5, 6, 11, and 12. The processing circuit may be dedicated hardware, or may be a central processing unit (CPU) that executes a program stored in a memory.

The hardware configuration that implements the functions of the antenna device 102 is similar to the hardware configuration that implements the functions of the antenna device 100 illustrated in FIG. 8A. The hardware configuration that executes software that implements the functions of the antenna device 102 is similar to the hardware configuration that implements the functions of the antenna device 100 illustrated in FIG. 8B.

In a case where the processing circuit is the processing circuit 200a of dedicated hardware illustrated in FIG. 8A, the processing circuit 200a corresponds to, for example, a single circuit, a composite circuit, a programmed processor, a parallel programmed processor, an application specific integrated circuit (ASIC), a field-programmable gate array (FPGA), or a combination thereof.

In the antenna device 102, the functions of the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the function of the spectrum amplitude comparing unit 41 in the noise elimination unit 44, and the functions of the IDFT 5, the inverter carrier frequency detecting unit 6, and the inverter carrier frequency acquiring communication unit 8 in the noise elimination device 103 may be implemented by separate processing circuits, or these functions may be collectively implemented by one processing circuit.

In a case where the processing circuit is the processor 200b illustrated in FIG. 8B, in the antenna device 102, the functions of the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the function of the spectrum amplitude comparing unit 41 in the noise elimination unit 44, and the functions of the IDFT 5, the inverter carrier frequency detecting unit 6, and the inverter carrier frequency acquiring communication unit 8 in the noise elimination device 103 are implemented by software, firmware, or a combination of software and firmware.

Note that the software or firmware is described as a program and stored in the memory 200c.

By reading and executing the program stored in the memory 200c, the processor 200b implements, in the antenna device 102, the functions of the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the function of the spectrum amplitude comparing unit 41 in the noise elimination unit 44, and the functions of the IDFT 5, the inverter carrier frequency detecting unit 6, and the inverter carrier frequency acquiring communication unit 8 in the noise elimination device 103. That is, the antenna device 102 includes the memory 200c that stores a program that performs the processes of the individual steps illustrated in FIGS. 4, 5, 6, 11, and 12 when these functions are performed by the processor 200b.

These programs cause a computer to perform, in the antenna device 102, the procedures or methods performed by the antenna-factor correction unit 12, the frequency conversion unit 13, the amplification unit 14, and the ADC 15 in the reception-signal input unit 10, and the procedures or methods performed by the multiplier 21, the NCO 22, the in-phase-signal extraction unit 23, and the quadrature-signal extraction unit 24 in the synchronous detection unit 20, the procedures or methods performed by the DFT 31a and the DFT 31b of the discrete Fourier transform unit 30a in the spectrum generation unit 30, the procedures or methods performed by the multiplier 32, the adder 33b, and the adder 33a in the spectrum generation unit 30, the procedure or method performed by the spectrum amplitude comparing unit 41 in the noise elimination unit 44, and the procedures or methods performed by the IDFT 5, the inverter carrier frequency detecting unit 6, and the inverter carrier frequency acquiring communication unit 8 in the noise elimination device 103. The memory 200c may be a computer-readable storage medium that stores a program that causes a computer to function as, in the antenna device 102, the antenna-factor correction unit 12, the frequency conversion unit 13, the amplification unit 14, and the ADC 15 in the reception-signal input unit 10, and the multiplier 21, the NCO 22, the in-phase-signal extraction unit 23, and the quadrature-signal extraction unit 24 in the synchronous detection unit 20, the DFT 31a and the DFT 31b of the discrete Fourier transform unit 30a in the spectrum generation unit 30, the multiplier 32, the adder 33b, and the adder 33a in the spectrum generation unit 30, the spectrum amplitude comparing unit 41 in the noise elimination unit 44, the IDFT 5, the inverter carrier frequency detecting unit 6, and the inverter carrier frequency acquiring communication unit 8 in the noise elimination device 103.

The processor 200b corresponds to, for example, a central processing unit (CPU), a processing device, an arithmetic device, a processor, a microprocessor, a microcomputer, a digital signal processor (DSP), or the like.

The memory 200c corresponds to, for example, a non-volatile or volatile semiconductor memory such as a random access memory (RAM), a read only memory (ROM), a flash memory, an erasable programmable read only memory (EPROM), or an electrically-EPROM (EEPROM); a magnetic disk such as a hard disk or a flexible disk, a flexible disk; an optical disk, a compact disk, a mini disk, a compact disc (CD), a digital versatile disc (DVD), or the like.

Some of the functions of, in the antenna device 102, the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the function of the spectrum amplitude comparing unit 41 in the noise elimination unit 44, and the functions of the IDFT 5, the inverter carrier frequency detecting unit 6, and the inverter carrier frequency acquiring communication unit 8 in the noise elimination device 103 may be implemented by dedicated hardware, and some may be implemented by software or firmware.

For example, the functions of the antenna-factor correction unit 12, the frequency conversion unit 13, the amplification unit 14, and the ADC 15 in the reception-signal input unit 10 are implemented by a processing circuit as dedicated hardware. In the noise elimination device 103, the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the function of the spectrum amplitude comparing unit 41 in the noise elimination unit 44, and the functions of the IDFT 5, the inverter carrier frequency detecting unit 6, and the inverter carrier frequency acquiring communication unit 8 may be implemented by the processor 200b reading and executing the program stored in the memory 200c.

As described above, the processing circuit can implement each of the functions by hardware, software, firmware, or a combination thereof.

As described above, the noise elimination device 103 according to the second embodiment includes the synchronous detection unit 20 (detection unit) that generates an in-phase signal and a quadrature signal by multiplying a double-sideband amplitude modulation signal by a signal synchronized with the carrier of the double-sideband amplitude modulation signal, the discrete Fourier transform unit 30a that generates an in-phase signal spectrum by performing discrete Fourier transform on the in-phase signal generated by the synchronous detection unit 20 and generates a quadrature signal spectrum by performing discrete Fourier transform on the quadrature signal generated by the synchronous detection unit 20, the spectrum calculation unit 30b that calculates an upper-sideband signal spectrum by multiplying the quadrature signal spectrum by an imaginary unit and adding the quadrature signal spectrum to which the imaginary unit is multiplied to the in-phase signal spectrum, and calculates a lower-sideband signal spectrum by subtracting the quadrature signal spectrum to which the imaginary unit is multiplied from the in-phase signal spectrum generated by the discrete Fourier transform unit 30a, and the noise elimination unit 44 that generates a noise-eliminated spectrum by performing noise elimination on the basis of the noise superimposed on at least one spectrum of the upper-sideband signal spectrum or the lower-sideband signal spectrum calculated by the spectrum calculation unit 30b.

In addition, the noise elimination unit 44 in the noise elimination device 103 according to the second embodiment generates the noise-eliminated spectrum by comparing, for each frequency, the power value of the in-phase signal spectrum generated by the discrete Fourier transform unit 30a with at least one or more of the power values of the upper-sideband signal spectrum and the lower-sideband signal spectrum calculated by the spectrum calculation unit 30b and extracting the lowest power value for each frequency.

According to the configuration described above, for example, in a case where the symmetric noise is superimposed on a double-sideband amplitude modulation signal and in the double-sideband amplitude modulation signal, the noise does not appear in an in-phase signal spectrum but appears in a quadrature signal spectrum, it is possible to extract the power value of the in-phase signal spectrum not including the symmetric noise because of the reason described above. As a result, it is possible to suppress a decrease in the accuracy of noise elimination. Furthermore, even in a case where noise other than the symmetric noise is superimposed on the double-sideband amplitude modulation signal, noise elimination can be suitably performed by extracting the lowest power value for each frequency.

Third Embodiment

The first embodiment has described the configuration in which the noise elimination unit 40 includes the spectrum inversion-elimination unit 42. A configuration in which the noise elimination unit includes a spectrum inversion-elimination unit and a spectrum amplitude comparing unit will be described in the third embodiment.

Hereinafter, the third embodiment will be described with reference to the drawings. Note that configurations with functions similar to those described in the first embodiment are denoted by the same reference numerals, and description thereof will be omitted.

Figure 13:
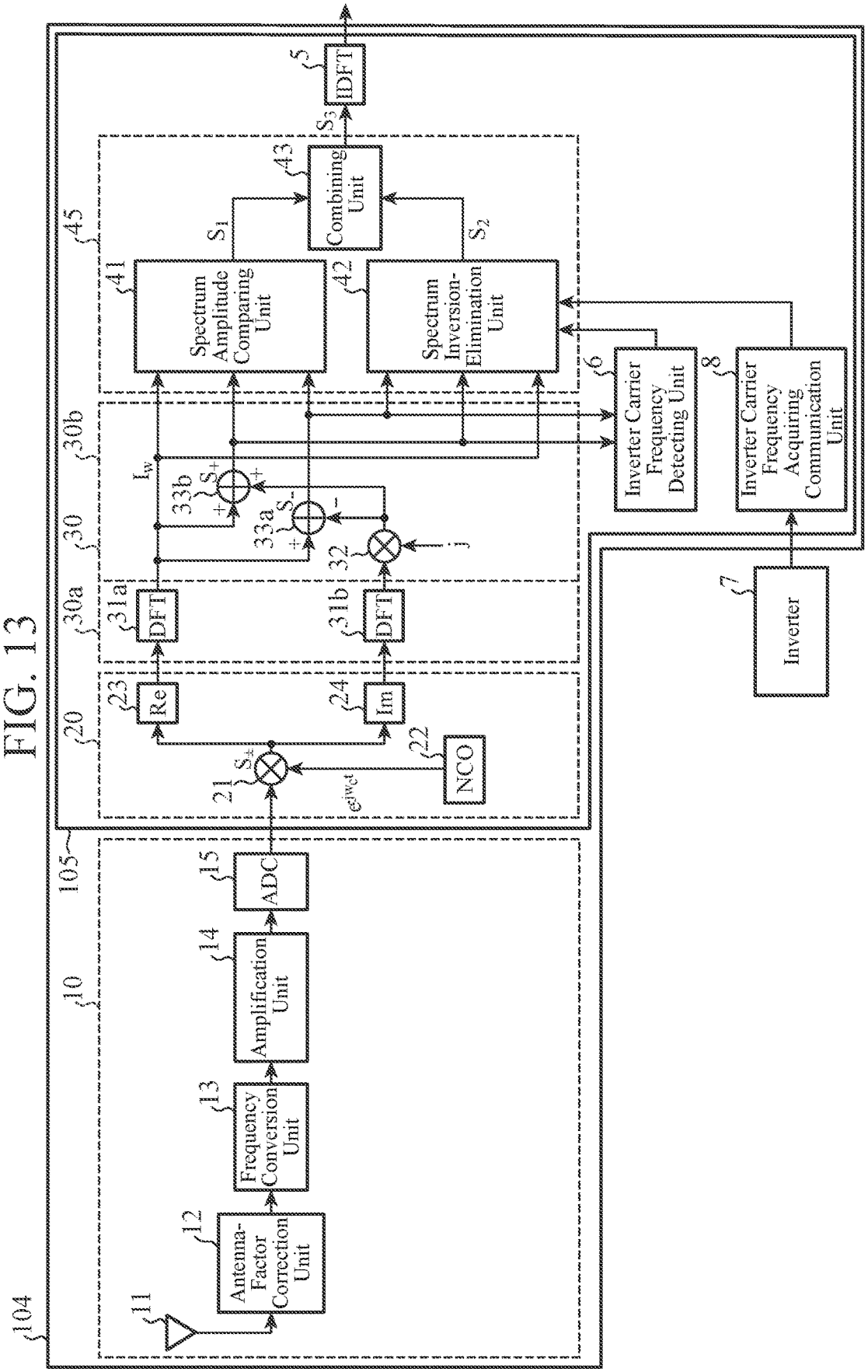
FIG. 13 is a block diagram illustrating a configuration of an antenna device according to a third embodiment.

FIG. 13 is a block diagram illustrating a configuration of an antenna device 104 according to the third embodiment. As illustrated in FIG. 13, as compared with the antenna device 100 according to the first embodiment, in the antenna device 104, a noise elimination unit 45 of a noise elimination device 105 further includes the spectrum amplitude comparing unit 41 and a combining unit 43.

The spectrum inversion-elimination unit 42 of the noise elimination unit 45 according to the third embodiment generates a first spectrum and a second spectrum by a method similar to the method described in the first embodiment. The spectrum inversion-elimination unit 42 outputs the generated first spectrum and the generated second spectrum to the combining unit 43. Note that the spectrum inversion-elimination unit 42 may output only one of the generated first spectrum and the generated second spectrum to the combining unit 43.

The spectrum amplitude comparing unit 41 of the noise elimination unit 45 according to the third embodiment further generates a third spectrum by comparing, for each frequency, the power value of an in-phase signal spectrum generated by the discrete Fourier transform unit 30a with at least one or more of the power values of an upper-sideband signal spectrum and a lower-sideband signal spectrum calculated by the spectrum calculation unit 30b and extracting the lowest power value for each frequency. The spectrum amplitude comparing unit 41 outputs the generated third spectrum to the combining unit 43.

The combining unit 43 of the noise elimination unit 45 according to the third embodiment generates a noise-eliminated spectrum by comparing, for each frequency, at least two or more of the power values of the first spectrum and second spectrum generated by the spectrum inversion-elimination unit 42 and the power value of the third spectrum generated by the spectrum amplitude comparing unit 41 and extracting the lowest power value for each frequency. The combining unit 43 outputs the generated noise-eliminated spectrum ($S_3$ in FIG. 13) to the IDFT 5.

The combining unit 43 may generate the noise-eliminated spectrum by comparing, for each frequency, the power value of the first spectrum generated by the spectrum inversion-elimination unit 42 with the power value of the third spectrum generated by the spectrum amplitude comparing unit 41, and extracting the lowest power value for each frequency. Alternatively, the combining unit 43 may generate the noise-eliminated spectrum by comparing, for each frequency, the power value of the second spectrum generated by the spectrum inversion-elimination unit 42 with the power value of the third spectrum generated by the spectrum amplitude comparing unit 41, and extracting the lowest power value for each frequency. Alternatively, the combining unit 43 may generate the noise-eliminated spectrum by comparing, for each frequency, the power value of the first spectrum generated by the spectrum inversion-elimination unit 42 with the power value of the second spectrum generated by the spectrum inversion-elimination unit 42, and extracting the lowest power value for each frequency.

Note that the spectrum inversion-elimination unit 42 of the noise elimination unit 45 according to the third embodiment may generate the first spectrum and the second spectrum by a method similar to the method described in the first embodiment, and then generate the noise-eliminated spectrum on the basis of the generated first spectrum and the generated second spectrum. In this case, the process performed by the spectrum amplitude comparing unit 41 and the process performed by the combining unit 43 are unnecessary, and the IDFT 5 generates a time domain signal by performing inverse discrete Fourier transform on the noise-eliminated spectrum generated by the spectrum inversion-elimination unit 42.

Figure 14D:
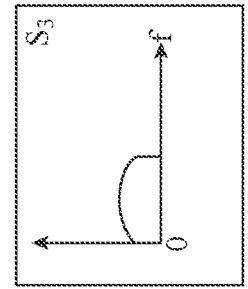
FIG. 14D is a graph illustrating a noise-eliminated spectrum generated by a combining unit of the noise elimination unit according to the third embodiment.
Figure 14C:
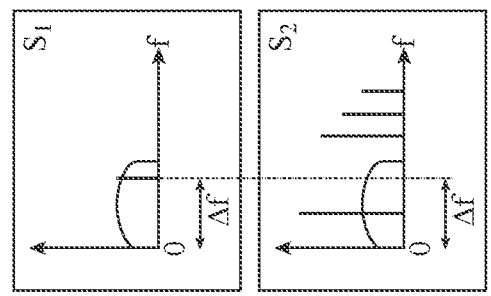
FIG. 14C illustrates a graph of a third spectrum generated by the spectrum amplitude comparing unit of a noise elimination unit according to the third embodiment and a graph of a second spectrum generated by a spectrum inversion-elimination unit of the noise elimination unit according to the third embodiment.
Figure 14B:
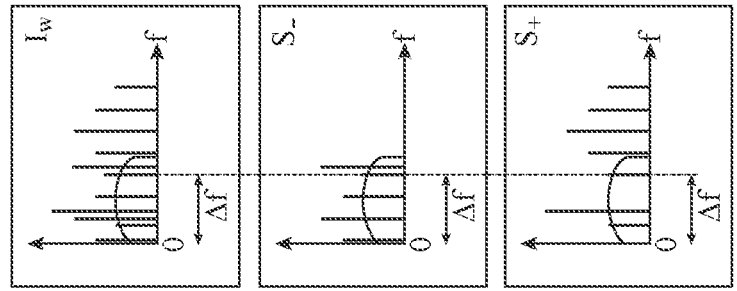
FIG. 14B illustrates a graph of an in-phase signal spectrum generated by a DFT of a discrete Fourier transform unit according to the third embodiment, a graph of a lower-sideband signal spectrum calculated by an adder of a spectrum calculation unit according to the third embodiment, and a graph of an upper-sideband signal spectrum calculated by the adder of the spectrum calculation unit according to the third embodiment.
Figure 14A:
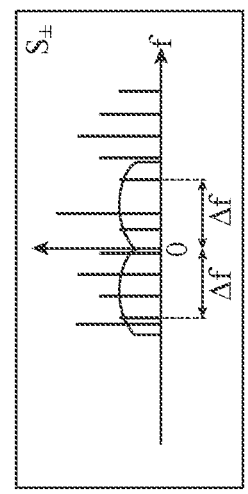
FIG. 14A is a graph illustrating a frequency domain spectrum obtained by performing discrete Fourier transform on a double-sideband amplitude modulation signal on which synchronous detection is performed by a multiplier of a synchronous detection unit according to the third embodiment.

Hereinafter, a more specific function of the noise elimination unit 45 will be described with reference to the drawings. FIG. 14A is a graph illustrating a frequency domain spectrum obtained by performing discrete Fourier transform on a double-sideband amplitude modulation signal on which synchronous detection is performed by the multiplier 21 of the synchronous detection unit 20 according to the third embodiment. FIG. 14B illustrates a graph (upper graph) of an in-phase signal spectrum generated by the DFT 31a of the discrete Fourier transform unit 30a according to the third embodiment, a graph (middle graph) of a lower-sideband signal spectrum calculated by the adder 33a of the spectrum calculation unit 30b according to the third embodiment, and a graph (lower graph) of an upper-sideband signal spectrum calculated by the adder 33b of the spectrum calculation unit 30b according to the third embodiment. FIG. 14C illustrates a graph (upper graph) of a third spectrum generated by the spectrum amplitude comparing unit 41 of the noise elimination unit 45 according to the third embodiment and a graph (lower graph) of a second spectrum generated by the spectrum inversion-elimination unit 42 of the noise elimination unit 45 according to the third embodiment. FIG. 14D is a graph illustrating a noise-eliminated spectrum generated by the combining unit 43 of the noise elimination unit 45 according to the third embodiment.

As indicated by two bar lines at a frequency of $\Delta f$ in FIG. 14A, the symmetric noise is superimposed on the double-sideband amplitude modulation signal. The spectrum inversion-elimination unit 42 according to the third embodiment generates the second spectrum (lower graph in FIG. 14C) by a method similar to the method described in the first embodiment. For example, the spectrum amplitude comparing unit 41 according to the third embodiment generates the third spectrum (upper graph in FIG. 14C) by comparing, for each frequency, the power value (upper graph in FIG. 14B) of the in-phase signal spectrum generated by the discrete Fourier transform unit 30a, the power value (lower graph in FIG. 14B) of the upper-sideband signal spectrum, and the power value (middle graph in FIG. 14B) of the lower-sideband signal spectrum, the upper-sideband signal spectrum and the lower-sideband signal spectrum being calculated by the spectrum calculation unit 30b, and extracting the lowest power value for each frequency.

As illustrated in FIG. 14C, the noise corresponding to the symmetric noise is not eliminated in the third spectrum (upper graph in FIG. 14C), but the noise corresponding to the symmetric noise is eliminated in the second spectrum (lower graph in FIG. 14C). The combining unit 43 of the noise elimination unit 45 according to the third embodiment then generates the noise-eliminated spectrum by comparing, for each frequency, the power value of the second spectrum generated by the spectrum inversion-elimination unit 42 with the power value of the third spectrum generated by the spectrum amplitude comparing unit 41, and extracting the lowest power value for each frequency. As a result, as illustrated in the graph of FIG. 14D, the noise corresponding to the symmetric noise is eliminated in the noise-eliminated spectrum.

Hereinafter, an operation of the antenna device 104 according to the third embodiment will be described with reference to the drawings. Note that the operation of the antenna device 104 according to the third embodiment is similar to the operation of the antenna device 100 according to the first embodiment except that step ST500 is partially different, and step ST400 and step ST600 are further performed. Therefore, description of steps other than step ST400, step ST500, and step ST600 is omitted.

Figure 15:
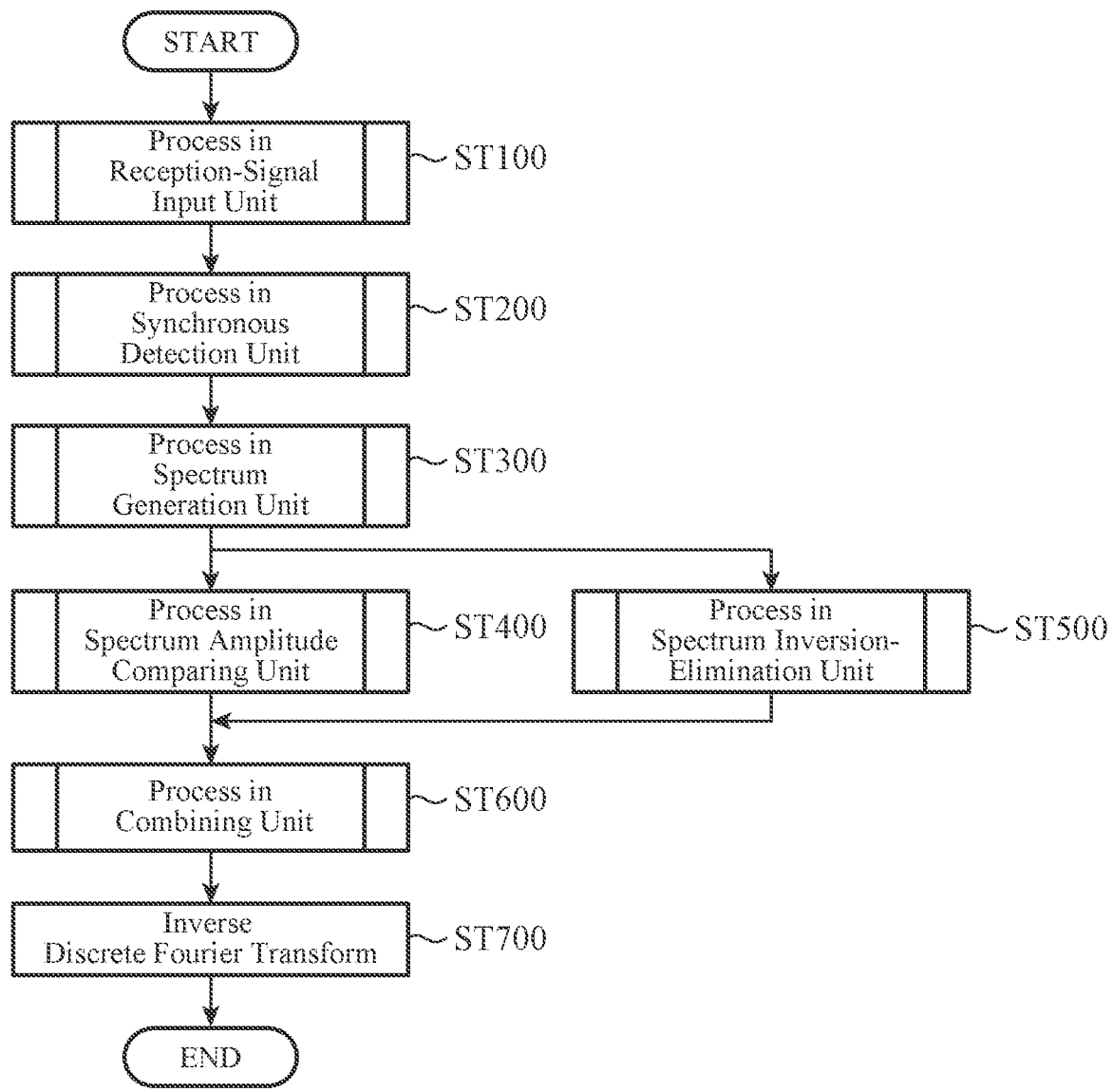
FIG. 15 is a flowchart illustrating a noise elimination method performed by the antenna device according to the third embodiment.

FIG. 15 is a flowchart illustrating a noise elimination method performed by the antenna device 104 according to the third embodiment. In step ST400, the spectrum amplitude comparing unit 41 according to the third embodiment generates the third spectrum by comparing, for each frequency, the power value of the in-phase signal spectrum generated by the discrete Fourier transform unit 30a with at least one or more of the power values of the upper-sideband signal spectrum and the lower-sideband signal spectrum calculated by the spectrum calculation unit 30b and extracting the lowest power value for each frequency. The spectrum amplitude comparing unit 41 outputs the generated third spectrum to the combining unit 43.

In addition, in step ST500, the spectrum inversion-elimination unit 42 according to the third embodiment generates the first spectrum and the second spectrum by a method similar to the method described in the first embodiment. The spectrum inversion-elimination unit 42 outputs the generated first spectrum and the generated second spectrum to the combining unit 43.

Next, in step ST600, the combining unit 43 according to the third embodiment generates the noise-eliminated spectrum by comparing, for each frequency, at least two or more of the power values of the first spectrum and the second spectrum generated by the spectrum inversion-elimination unit 42 and the power value of the third spectrum generated by the spectrum amplitude comparing unit 41 and extracting the lowest power value for each frequency.

Figure 16:
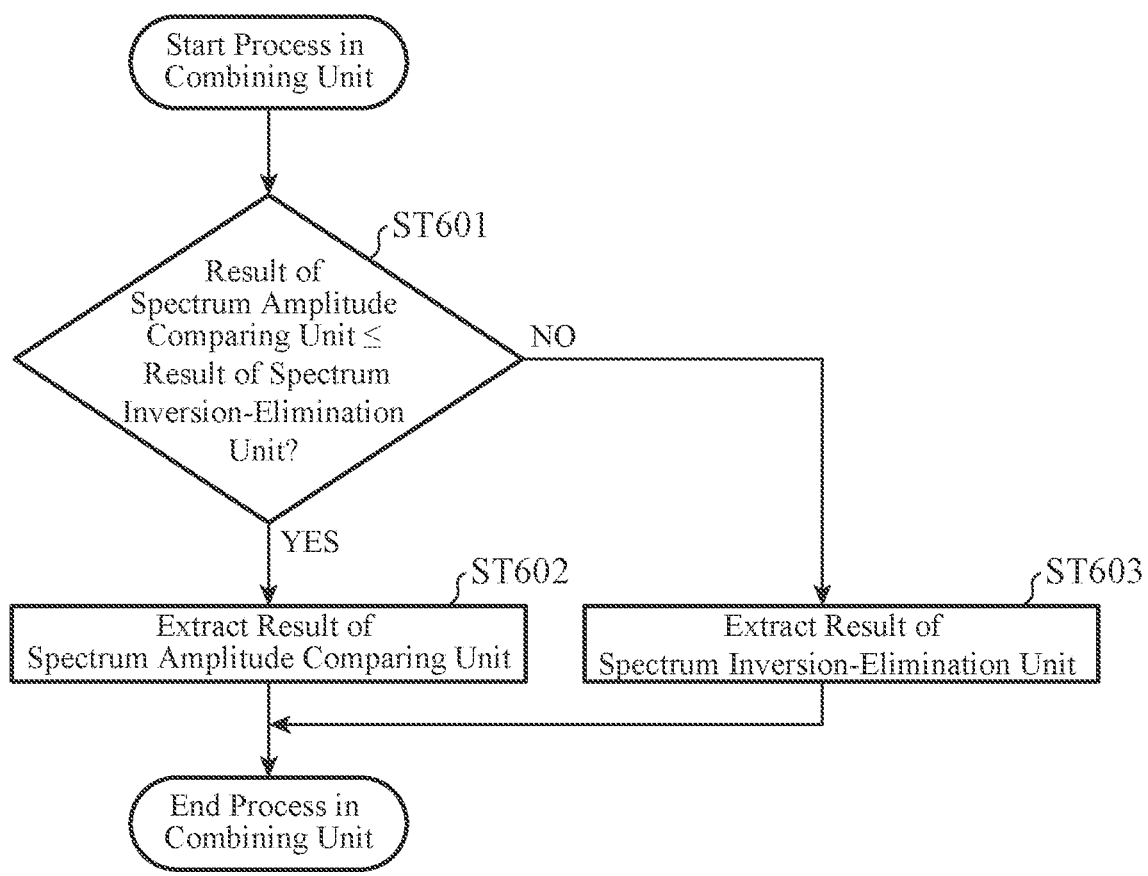
FIG. 16 is a flowchart illustrating a noise elimination method performed by the combining unit according to the third embodiment.

Hereinafter, an operation of the combining unit 43 of the noise elimination unit 45 in the noise elimination device 105 according to the third embodiment will be described with reference to the drawings. FIG. 16 is a flowchart illustrating a noise elimination method performed by the combining unit 43 according to the third embodiment. Note that the following description of each step is a detailed description of step ST600 described above. Each of the following steps starts after step ST400 and step ST500 described above. In addition, in step ST500 described above, it is assumed that the spectrum inversion-elimination unit 42 outputs only the generated second spectrum to the combining unit 43.

First, the combining unit 43 determines, for each frequency, whether or not the power value of the third spectrum calculated by the spectrum amplitude comparing unit 41 is equal to or less than the power value of the second spectrum generated by the spectrum inversion-elimination unit 42 (step ST601). That is, although not illustrated, step ST601 is repeatedly performed for each frequency. Therefore, step ST602 and step ST603 to be described below are also repeatedly performed for each frequency.

If the combining unit 43 determines that the power value of the third spectrum is equal to or less than the power value of the second spectrum (YES in step ST601), the combining unit 43 extracts the power value of the third spectrum (step ST602).

If the combining unit 43 determines that the power value of the third spectrum is larger than the power value of the second spectrum (NO in step ST601), the combining unit 43 extracts the power value of the second spectrum (step ST603).

Although not illustrated, the combining unit 43 generates the noise-eliminated spectrum using the power value extracted by repeatedly performing the steps from step ST601 to step ST603 for each frequency.

In the antenna device 104, the functions of the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the functions of the spectrum inversion-elimination unit 42, the spectrum amplitude comparing unit 41, and the combining unit 43 in the noise elimination unit 45, and the functions of the IDFT 5, the inverter carrier frequency detecting unit 6, and the inverter carrier frequency acquiring communication unit 8 in the noise elimination device 105 are implemented by a processing circuit. That is, the antenna device 104 includes a processing circuit for performing the processes of the individual steps illustrated in FIGS. 4, 5, 6, 15, and 16. The processing circuit may be dedicated hardware, or may be a central processing unit (CPU) that executes a program stored in a memory.

The hardware configuration that implements the functions of the antenna device 104 is similar to the hardware configuration that implements the functions of the antenna device 100 illustrated in FIG. 8A. The hardware configuration that executes software that implements the functions of the antenna device 104 is similar to the hardware configuration that executes software that implements the functions of the antenna device 100 illustrated in FIG. 8B.

In a case where the processing circuit is the processing circuit 200a of dedicated hardware illustrated in FIG. 8A, the processing circuit 200a corresponds to, for example, a single circuit, a composite circuit, a programmed processor, a parallel programmed processor, an application specific integrated circuit (ASIC), a field-programmable gate array (FPGA), or a combination thereof.

In the antenna device 104, the functions of the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the functions of the spectrum inversion-elimination unit 42, the spectrum amplitude comparing unit 41, and the combining unit 43 in the noise elimination unit 45, and the functions of the IDFT 5, the inverter carrier frequency detecting unit 6, and the inverter carrier frequency acquiring communication unit 8 in the noise elimination device 105 may be implemented by separate processing circuits, or these functions may be collectively implemented by one processing circuit.

In a case where the processing circuit is the processor 200b illustrated in FIG. 8B, in the antenna device 104, the functions of the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the functions of the spectrum inversion-elimination unit 42, the spectrum amplitude comparing unit 41, and the combining unit 43 in the noise elimination unit 45, and the functions of the IDFT 5, the inverter carrier frequency detecting unit 6, and the inverter carrier frequency acquiring communication unit 8 in the noise elimination device 105 are implemented by software, firmware, or a combination of software and firmware.

Note that the software or firmware is described as a program and stored in the memory 200c.

By reading and executing the program stored in the memory 200c, the processor 200b implements, in the antenna device 104, the functions of the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the functions of the spectrum inversion-elimination unit 42, the spectrum amplitude comparing unit 41, and the combining unit 43 in the noise elimination unit 45, and the functions of the IDFT 5, the inverter carrier frequency detecting unit 6, and the inverter carrier frequency acquiring communication unit 8 in the noise elimination device 105. That is, the antenna device 104 includes the memory 200c that stores a program that results in performing the processes of the individual steps illustrated in FIGS. 3, 4, 5, 6, 7, 15, and 16 when these functions are performed by the processor 200b.

These programs cause a computer to perform, in the antenna device 104, the procedures or methods performed by the antenna-factor correction unit 12, the frequency conversion unit 13, the amplification unit 14, and the ADC 15 in the reception-signal input unit 10, and the procedures or methods performed by the multiplier 21, the NCO 22, the in-phase-signal extraction unit 23, and the quadrature-signal extraction unit 24 in the synchronous detection unit 20, the procedures or methods performed by the DFT 31a and the DFT 31b of the discrete Fourier transform unit 30a in the spectrum generation unit 30, the procedures or methods performed by the multiplier 32, the adder 33b, and the adder 33a in the spectrum generation unit 30, the procedures or methods performed by the spectrum inversion-elimination unit 42, the spectrum amplitude comparing unit 41, and the combining unit 43 in the noise elimination unit 45, the procedures or methods performed by the IDFT 5, the inverter carrier frequency detecting unit 6, and the inverter carrier frequency acquiring communication unit 8 in the noise elimination device 105. The memory 200c may be a computer-readable storage medium that stores a program that causes a computer to function as, in the antenna device 104, the antenna-factor correction unit 12, the frequency conversion unit 13, the amplification unit 14, and the ADC 15 in the reception-signal input unit 10, and the multiplier 21, the NCO 22, the in-phase-signal extraction unit 23, and the quadrature-signal extraction unit 24 in the synchronous detection unit 20, the DFT 31a and the DFT 31b of the discrete Fourier transform unit 30a in the spectrum generation unit 30, the multiplier 32, the adder 33b, and the adder 33a in the spectrum generation unit 30, the spectrum inversion-elimination unit 42, the spectrum amplitude comparing unit 41, and the combining unit 43 in the noise elimination unit 45, the IDFT 5, the inverter carrier frequency detecting unit 6, and the inverter carrier frequency acquiring communication unit 8 in the noise elimination device 105.

The processor 200b corresponds to, for example, a central processing unit (CPU), a processing device, an arithmetic device, a processor, a microprocessor, a microcomputer, a digital signal processor (DSP), or the like.

The memory 200c corresponds to, for example, a non-volatile or volatile semiconductor memory such as a random access memory (RAM), a read only memory (ROM), a flash memory, an erasable programmable read only memory (EPROM), or an electrically-EPROM (EEPROM); a magnetic disk such as a hard disk or a flexible disk, a flexible disk; an optical disk, a compact disk, a mini disk, a compact disc (CD), a digital versatile disc (DVD), or the like.

Some of the functions of, in the antenna device 104, the antenna-factor correction unit 12, the frequency conversion unit 13, the amplification unit 14, and the ADC 15 in the reception-signal input unit 10, and the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the functions of the spectrum inversion-elimination unit 42, the spectrum amplitude comparing unit 41, and the combining unit 43 in the noise elimination unit 45, and the functions of the IDFT 5, the inverter carrier frequency detecting unit 6, and the inverter carrier frequency acquiring communication unit 8 in the noise elimination device 105 may be implemented by dedicated hardware, and some may be implemented by software or firmware.

For example, the functions of the antenna-factor correction unit 12, the frequency conversion unit 13, the amplification unit 14, and the ADC 15 in the reception-signal input unit 10 are implemented by a processing circuit as dedicated hardware. In the noise elimination device 105, the functions of the multiplier 21, the NCO 22, the in-phase-signal extraction unit 23, and the quadrature-signal extraction unit 24 in the synchronous detection unit 20, the functions of the DFT 31a and the DFT 31b of the discrete Fourier transform unit 30a in the spectrum generation unit 30, the functions of the multiplier 32, the adder 33b, and the adder 33a in the spectrum generation unit 30, the functions of the spectrum inversion-elimination unit 42, the spectrum amplitude comparing unit 41, and the combining unit 43 in the noise elimination unit 45, and the functions of the IDFT 5, the inverter carrier frequency detecting unit 6, and the inverter carrier frequency acquiring communication unit 8 may be implemented by the processor 200b reading and executing the program stored in the memory 200c.

As described above, the processing circuit can implement each of the functions by hardware, software, firmware, or a combination thereof.

As described above, the noise elimination unit 45 in the noise elimination device 105 according to the third embodiment further generates the third spectrum by comparing, for each frequency, the power value of the in-phase signal spectrum generated by the discrete Fourier transform unit 30a with at least one or more of the power values of the upper-sideband signal spectrum and the lower-sideband signal spectrum calculated by the spectrum calculation unit 30b and extracting the lowest power value for each frequency, and then generates the noise-eliminated spectrum by comparing, for each frequency, at least two or more of the power value of the generated first spectrum, the power value of the generated second spectrum, and the power value of the generated third spectrum and extracting the lowest power value for each frequency.

As described above, in a double-sideband amplitude modulation signal on which symmetric noise is superimposed, the noise does not appear in an in-phase signal spectrum, but may appear in a quadrature signal spectrum. Alternatively, in the double-sideband amplitude modulation signal on which the symmetric noise is superimposed, the noise appears in the in-phase signal spectrum, but does not appear in the quadrature signal spectrum in some cases. In any case, according to the configuration described above, the power value of the spectrum not including the symmetric noise can be extracted. As a result, it is possible to suppress a decrease in the accuracy of noise elimination.

Note that it is possible to freely combine the embodiments, modify any component of each embodiment, or omit any component of each embodiment.

INDUSTRIAL APPLICABILITY

The noise elimination device according to the present disclosure can suppress a decrease in the accuracy of noise elimination, and thus can be used for an antenna device.

REFERENCE SIGNS LIST

5: IDFT, 6: inverter carrier frequency detecting unit, 7: inverter, 8: inverter carrier frequency acquiring communication unit, 10: reception-signal input unit, 11: antenna, 12: antenna-factor correction unit, 13: frequency conversion unit, 14: amplification unit, 15: ADC, 20: synchronous detection unit, 21: multiplier, 22: NCO, 23: in-phase-signal extraction unit, 24: quadrature-signal extraction unit, 30: spectrum generation unit, 30a: discrete Fourier transform unit, 30b: spectrum calculation unit, 31a: DFT, 31b: DFT, 32: multiplier, 33a: adder, 33b: adder, 40: noise elimination unit, 41: spectrum amplitude comparing unit, 42: spectrum inversion-elimination unit, 43: combining unit, 44: noise elimination unit, 45: noise elimination unit, 100: antenna device, 101: noise elimination device, 102: antenna device, 103: noise elimination device, 104: antenna device, 105: noise elimination device, 200a: processing circuit, 200b: processor, 200c: memory

The invention claimed is:

1. A noise elimination device comprising:
processing circuitry to perform a process to:
detect a reception signal;
generate a reception signal spectrum by performing discrete Fourier transform on a complex detection output; and
generate a noise-eliminated spectrum by performing noise elimination on a basis of noise superimposed on the reception signal spectrum, wherein
the noise superimposed on the reception signal spectrum indicates a frequency spectrum with symmetry with respect to a center frequency of the noise, and
the process generates the noise-eliminated spectrum by performing noise elimination on a basis of symmetry of the noise superimposed on the reception signal spectrum, and
a reception signal detected is a double-sideband amplitude modulation signal,
the process generates an in-phase signal and a quadrature signal by multiplying the double-sideband amplitude modulation signal by a signal synchronized with a carrier of the double-sideband amplitude modulation signal,
the process generates an in-phase signal spectrum by performing discrete Fourier transform on the in-phase signal generated, and generates a quadrature signal spectrum by performing discrete Fourier transform on the quadrature signal generated,
the process further comprising to calculate an upper-sideband signal spectrum by multiplying the quadrature signal spectrum by an imaginary unit and adding a quadrature signal spectrum to which the imaginary unit is multiplied to the in-phase signal spectrum, and to calculate a lower-sideband signal spectrum by subtracting the quadrature signal spectrum to which the imaginary unit is multiplied from the in-phase signal spectrum, wherein
noise superimposed on the upper-sideband signal spectrum and the lower-sideband signal spectrum indicates a frequency spectrum with symmetry with respect to a center frequency of the noise, and
the process generates the noise-eliminated spectrum by performing noise elimination on a basis of symmetry of noise superimposed on at least one reception signal spectrum of the upper-sideband signal spectrum or the lower-sideband signal spectrum calculated.

2. The noise elimination device according to claim 1, wherein
noise superimposed on the upper-sideband signal spectrum and the lower-sideband signal spectrum is inverter noise indicating a frequency spectrum with symmetry, the process
generates a first spectrum by extracting a first frequency closest to a carrier frequency of the double-sideband amplitude modulation signal and a second frequency second closest to the carrier frequency of the double-sideband amplitude modulation signal from frequencies of integer multiples of a carrier frequency of an inverter that is a source of generation of the inverter noise, and
inverting, in the upper-sideband signal spectrum or the lower-sideband signal spectrum, noise of the inverter noise that is present in a band on an opposite side to a band on a side of an origin corresponding to the carrier frequency of the double-sideband amplitude modulation signal with respect to a frequency corresponding to the first frequency to the side of the origin with the frequency corresponding to the first frequency as a center, and subtracting inverted noise from a spectrum of the upper-sideband signal spectrum or the lower-sideband signal spectrum, the spectrum being present in a band on a side of a frequency corresponding to the first frequency with reference to the origin,
generates a second spectrum by inverting, in the upper-sideband signal spectrum or the lower-sideband signal spectrum, noise of the inverter noise that is present on the opposite side to a band on the side of the origin corresponding to the carrier frequency of the double-sideband amplitude modulation signal with respect to the frequency corresponding to the second frequency to the side of the origin with the frequency corresponding to the second frequency as the center and subtracting inverted noise from a spectrum of the upper-sideband signal spectrum or the lower-sideband signal spectrum, the spectrum being present in the band on the side of the frequency corresponding to the second frequency with respect to the origin, and
generates the noise-eliminated spectrum on a basis of the first spectrum and the second spectrum.

3. The noise elimination device according to claim 2, wherein the process generates the noise-eliminated spectrum by comparing, for every frequency, at least two or more of power values of the first spectrum generated and the second spectrum generated and a power value of an in-phase signal spectrum generated and extracting a lowest power value for every frequency.

4. The noise elimination device according to claim 2, the process further comprising to detect a carrier frequency of the inverter by referring to an upper-sideband signal spectrum and a lower-sideband signal spectrum calculated.

5. The noise elimination device according to claim 2, the process further comprising to acquire information related to a carrier frequency of the inverter from the inverter.

6. The noise elimination device according to claim 2, wherein a carrier frequency of the inverter is set in advance.

7. The noise elimination device according to claim 2, wherein
the process
further generates a third spectrum by comparing, for every frequency, a power value of an in-phase signal spectrum generated with at least one or more of power values of an upper-sideband signal spectrum and a lower-sideband signal spectrum calculated and extracting a lowest power value for every frequency, and generates the noise-eliminated spectrum by comparing, for every frequency, at least two or more of a power value of a first spectrum generated, a power value of a second spectrum generated, and a power value of a third spectrum generated and extracting a lowest power value for every frequency.

8. The noise elimination device according to claim 1, wherein
the process includes
to output a signal synchronized with a carrier of the double-sideband amplitude modulation signal, and
perform synchronous detection by multiplying a signal output from the numerically controlled oscillator by the double-sideband amplitude modulation signal.

9. The noise elimination device according to claim 1, the process further comprising to generate a time domain signal by performing inverse discrete Fourier transform on a noise-eliminated spectrum generated.

10. An antenna device comprising:
the noise elimination device according to claim 1; and
a receptor to receive the reception signal.

11. The antenna device according to claim 10, wherein the receptor includes
an antenna to acquire the reception signal, and
an antenna-factor corrector to correct a reception signal acquired by the antenna in such a manner that an antenna factor of the antenna is constant.

12. A noise elimination method of a noise elimination device comprising:
detecting a reception signal;
generating a reception signal spectrum by performing discrete Fourier transform on a complex detection output; and
generating a noise-eliminated spectrum by performing noise elimination on a basis of noise superimposed on a reception signal spectrum calculated, wherein
the noise superimposed on the reception signal spectrum indicates a frequency spectrum with symmetry with respect to a center frequency of the noise;
the noise-eliminated spectrum is generated by performing noise elimination on the basis of symmetry of the noise superimposed on the reception signal spectrum,
a reception signal detected is a double-sideband amplitude modulation signal,
generating an in-phase signal and a quadrature signal by multiplying the double-sideband amplitude modulation signal by a signal synchronized with a carrier of the double-sideband amplitude modulation signal,
generating an in-phase signal spectrum by performing discrete Fourier transform on the in-phase signal generated, and generating a quadrature signal spectrum by performing discrete Fourier transform on the quadrature signal generated,
calculating an upper-sideband signal spectrum by multiplying the quadrature signal spectrum by an imaginary unit and adding a quadrature signal spectrum to which the imaginary unit is multiplied to the in-phase signal spectrum, and calculating a lower-sideband signal spectrum by subtracting the quadrature signal spectrum to which the imaginary unit is multiplied from the in-phase signal spectrum, wherein
noise superimposed on the upper-sideband signal spectrum and the lower-sideband signal spectrum indicates a frequency spectrum with symmetry with respect to a center frequency of the noise, and
generating the noise-eliminated spectrum by performing noise elimination on a basis of symmetry of noise superimposed on at least one reception signal spectrum of the upper-sideband signal spectrum or the lower-sideband signal spectrum calculated.

13. A noise elimination device comprising:
processing circuitry to perform a process:
to generate an in-phase signal and a quadrature signal by multiplying a double-sideband amplitude modulation signal by a signal synchronized with a carrier of the double-sideband amplitude modulation signal;
to generate an in-phase signal spectrum by performing discrete Fourier transform on the in-phase signal generated and generate a quadrature signal spectrum by performing discrete Fourier transform on the quadrature signal generated;
to calculate an upper-sideband signal spectrum by multiplying the quadrature signal spectrum by an imaginary unit and adding a quadrature signal spectrum to which the imaginary unit is multiplied to the in-phase signal spectrum, and to calculate a lower-sideband signal spectrum by subtracting the quadrature signal spectrum to which the imaginary unit is multiplied from the in-phase signal spectrum generated; and
to generate a noise-eliminated spectrum by performing noise elimination on a basis of noise superimposed on at least one spectrum of the upper-sideband signal spectrum or the lower-sideband signal spectrum calculated.

14. The noise elimination device according to claim 13, wherein the process generates the noise-eliminated spectrum by comparing, for every frequency, a power value of an in-phase signal spectrum generated with at least one or more of power values of an upper-sideband signal spectrum or a lower-sideband signal spectrum calculated and extracting a lowest power value for every frequency.

* * * * *